(12) United States Patent
Warner et al.

(10) Patent No.: US 7,569,001 B2
(45) Date of Patent: *Aug. 4, 2009

(54) FREE WHEEL CLUTCH MECHANISM FOR BICYCLE DRIVE TRAIN

(75) Inventors: Patrick Warner, Boulder, CO (US);
Michael H. Harding, Boulder, CO (US);
Mu-Chuan Wu, Tainan (TW); Andy Baker, Longmont, CO (US)

(73) Assignee: Nautilus, Inc., Vancouver, WA (US)

( * ) Notice: Subject to any disclaimer, the term of this patent is extended or adjusted under 35 U.S.C. 154(b) by 208 days.

This patent is subject to a terminal disclaimer.

(21) Appl. No.: 09/803,630

(22) Filed: Mar. 9, 2001

(65) Prior Publication Data

US 2003/0224911 A1 Dec. 4, 2003
US 2007/0004564 A9 Jan. 4, 2007

Related U.S. Application Data

(63) Continuation-in-part of application No. 09/379,560, filed on Aug. 23, 1999, now Pat. No. 6,641,507, which is a continuation of application No. 08/919,695, filed on Aug. 28, 1997, now Pat. No. 5,961,424.

(51) Int. Cl.
*A63B 21/00* (2006.01)
*A63B 69/16* (2006.01)

(52) U.S. Cl. .......................... 482/63; 482/57
(58) Field of Classification Search ................. 482/119, 482/51–53, 57–65; 192/17 D, 41 R, 64
See application file for complete search history.

(56) References Cited

U.S. PATENT DOCUMENTS 562,198 A 6/1896 Robinson ...................... 482/52
588,166 A 8/1897 McCoy ....................... 74/551.1
633,534 A 9/1899 Read ............................ 280/261

(Continued)

FOREIGN PATENT DOCUMENTS

AT 132504 5/1949

(Continued)

OTHER PUBLICATIONS

Advertisement: aerobika; "Giugiaro Trebispin 'Safety'", Apr. 23, 1998.

(Continued)

*Primary Examiner*—Stephen R Crow
(74) *Attorney, Agent, or Firm*—Dorsey & Whitney LLP

(57) ABSTRACT

An exercise bicycle including a frame having a seat and handlebars, a high-inertia flywheel having a hub at a center of rotation, the flywheel being rotatably supported on the frame at the hub, and a drive train including a drive sprocket, a crank arm attached to and extending from the drive sprocket, and a pedal attached to the crank arm, the drive train being rotatably supported by the frame. The drive train also includes a slave sprocket fixed to the flywheel at the hub, with the drive and slave sprockets connected in a direct-drive relationship, the drive train driveable in a forward and rearward directions to cause the flywheel to rotate. A clutch mechanism is positioned in engagement with the slave sprocket and the hub to create a frictional engagement between the sprocket and the hub, and to establish a break-free force threshold. When the drive train is actuated in the forward direction, the slave sprocket and the hub move together, and when the drive train is actuated in the rearward direction under the influence of a force greater than the break-free force threshold, the clutch mechanism slips between the slave sprocket and the hub, allowing the slave sprocket and the flywheel to move independently of one another. The clutch mechanism including a spring tensioner whereby the break-free force may be adjusted.

11 Claims, 23 Drawing Sheets

U.S. PATENT DOCUMENTS

| | | | | |
|---|---|---|---|---|
| 635,082 | A | 10/1899 | Stiles | 280/261 |
| 671,785 | A | 4/1901 | Young et al. | 482/57 |
| 1,336,774 | A | 4/1920 | Cooper | 482/57 |
| 1,507,554 | A | 9/1924 | Cooper | 482/57 |
| 1,636,327 | A | 7/1927 | Roe | 474/144 |
| 2,066,557 | A | 1/1937 | Cox | 248/429 |
| 2,320,489 | A | 6/1943 | Turner et al. | 272/73 |
| 2,446,363 | A | 8/1948 | Daum | 192/48.6 |
| 2,603,486 | A | 7/1952 | Hughes | 128/25 R |
| 2,616,416 | A | 11/1952 | Gillmeier | 128/25 |
| 2,857,750 | A | 10/1958 | Fox | |
| 3,062,204 | A | 11/1962 | Stefano | 482/57 |
| 3,092,983 | A | 6/1963 | Huber | |
| 3,511,097 | A | 5/1970 | Corwin | 482/57 |
| D218,338 | S | 8/1970 | Dimick et al. | D34/5 |
| D220,024 | S | 2/1971 | Fujiyoshi et al. | D90/8 |
| 3,578,800 | A | 5/1971 | DiNepi | 272/73 |
| 3,596,921 | A | 8/1971 | Bruckl | 273/80 B |
| 3,623,582 | A | 11/1971 | Giger et al. | 192/46 |
| 3,664,027 | A | 5/1972 | Fritz et al. | 33/174 R |
| D225,070 | S | 11/1972 | Proctor | D34/5 |
| D229,077 | S | 11/1973 | Scalingi et al. | D34/5 K |
| 3,809,402 | A | 5/1974 | Haines et al. | 273/73 C |
| 3,833,216 | A | 9/1974 | Philbin | 272/73 |
| D233,160 | S | 10/1974 | Jouk | D34/5 K |
| 3,854,561 | A | 12/1974 | Conde | 192/48.92 |
| 3,861,715 | A | 1/1975 | Mendoza | 280/260 |
| D234,305 | S | 2/1975 | Woods et al. | D34/5 K |
| 3,939,932 | A | 2/1976 | Rosen | 180/33 C |
| 3,955,764 | A * | 5/1976 | Phaup | 239/206 |
| 3,966,201 | A | 6/1976 | Mester | 272/72 |
| 3,995,491 | A | 12/1976 | Wolfla, II | 73/379 |
| D243,028 | S | 1/1977 | Proctor | D34/5 K |
| D243,165 | S | 1/1977 | Wheeler | D12/11 |
| 4,007,927 | A | 2/1977 | Proctor | 272/73 |
| 4,150,851 | A | 4/1979 | Cienfuegos | 297/195 |
| D251,747 | S | 5/1979 | Valentine et al. | D21/194 |
| 4,188,030 | A | 2/1980 | Hooper | 272/73 |
| D254,679 | S | 4/1980 | Gustafsson | D21/194 |
| 4,220,232 | A | 9/1980 | Fey et al. | 192/48.3 |
| D257,515 | S | 11/1980 | Faux | D21/194 |
| 4,266,794 | A | 5/1981 | Bals | 482/62 |
| 4,286,701 | A | 9/1981 | MacDonald | 192/48.3 |
| 4,298,893 | A | 11/1981 | Holmes | 272/73 |
| D262,302 | S | 12/1981 | Disbrow et al. | D21/194 |
| 4,313,602 | A | 2/1982 | Sullivan | 272/73 |
| 4,338,798 | A | 7/1982 | Gilman | 464/23 |
| 4,371,185 | A * | 2/1983 | Bals | 280/227 |
| D275,589 | S | 9/1984 | Gustafsson | D21/194 |
| 4,477,072 | A | 10/1984 | DeCloux | |
| D280,117 | S | 8/1985 | Collins | D21/194 |
| D280,118 | S | 8/1985 | Collins | D21/194 |
| 4,533,136 | A | 8/1985 | Smith et al. | 272/73 |
| 4,577,860 | A | 3/1986 | Matias et al. | 482/57 |
| D284,596 | S | 7/1986 | McNeil | D21/194 |
| 4,603,856 | A | 8/1986 | Fiore | 482/114 |
| D285,953 | S | 9/1986 | Gustafsson | D21/667 |
| 4,632,386 | A | 12/1986 | Beech | 482/57 |
| 4,645,472 | A | 2/1987 | Heidenreich | 464/48 |
| 4,657,244 | A | 4/1987 | Ross | 272/73 |
| D289,782 | S | 5/1987 | Szymski et al. | D21/194 |
| 4,671,396 | A | 6/1987 | Kotamaki | 192/41 |
| 4,673,177 | A * | 6/1987 | Szymski | 482/64 |
| D291,462 | S | 8/1987 | Aalto | D21/194 |
| D291,713 | S | 9/1987 | Kiiski | D21/667 |
| D292,225 | S | 10/1987 | Breger | D21/667 |
| D292,304 | S | 10/1987 | Ostrom | D21/194 |
| 4,705,269 | A | 11/1987 | DeBoer et al. | 272/73 |
| 4,712,789 | A | 12/1987 | Brilando | 272/73 |
| 4,712,790 | A | 12/1987 | Szymski | 272/73 |
| D296,457 | S | 6/1988 | Anitua | D21/667 |
| 4,757,988 | A | 7/1988 | Szymski | 482/62 |
| 4,768,777 | A | 9/1988 | Yang | 482/57 |
| 4,772,069 | A | 9/1988 | Szymski | 297/195 |
| D299,732 | S | 2/1989 | Gustafsson | D21/667 |
| 4,824,102 | A | 4/1989 | Lo | 482/57 |
| D301,157 | S | 5/1989 | Hess | |
| 4,880,225 | A | 11/1989 | Lucas et al. | 482/59 |
| 4,902,001 | A | 2/1990 | Balbo | 272/73 |
| 4,915,374 | A | 4/1990 | Watkins | 482/57 |
| 4,936,570 | A | 6/1990 | Szymski et al. | 272/73 |
| 5,000,469 | A | 3/1991 | Smith | 280/261 |
| 5,027,930 | A | 7/1991 | Reed | |
| 5,031,912 | A * | 7/1991 | Vaughn et al. | 482/118 |
| 5,046,723 | A | 9/1991 | Szymski et al. | 272/73 |
| 5,145,477 | A | 9/1992 | Han | 482/57 |
| 5,226,866 | A | 7/1993 | Engel et al. | |
| 5,232,422 | A | 8/1993 | Bishop, Jr. | 482/57 |
| 5,336,147 | A | 8/1994 | Sweeney, III | 482/57 |
| 5,423,728 | A | 6/1995 | Goldberg | 482/57 |
| 5,431,614 | A | 7/1995 | Jeranson | |
| 5,472,396 | A | 12/1995 | Brazaitis | 482/57 |
| D368,678 | S | 4/1996 | Wilcox et al. | D12/111 |
| D372,284 | S | 7/1996 | Wang et al. | D21/667 |
| D380,796 | S | 7/1997 | Wang et al. | D21/667 |
| D382,924 | S | 8/1997 | Wu | D21/667 |
| D382,925 | S | 8/1997 | Wu | D21/667 |
| 5,685,553 | A | 11/1997 | Wilcox et al. | 280/283 |
| 5,722,916 | A | 3/1998 | Goldberg | 482/57 |
| 5,816,372 | A * | 10/1998 | Carlson et al. | 188/267.2 |
| 5,833,575 | A * | 11/1998 | Holslag | 482/51 |
| D407,767 | S | 4/1999 | Chang | D21/663 |
| 5,944,638 | A | 8/1999 | Maresh et al. | |
| 5,961,424 | A | 10/1999 | Warner et al. | 482/63 |
| 6,146,313 | A | 11/2000 | Whan-Tong et al. | 482/51 |
| 6,155,958 | A | 12/2000 | Goldberg | 482/57 |
| 6,234,939 | B1 | 5/2001 | Moser et al. | |
| 6,283,486 | B1 | 9/2001 | Huang | |
| 6,557,679 | B1 * | 5/2003 | Warner et al. | 192/17 D |
| 6,561,952 | B2 | 5/2003 | Wu | 482/3 |
| 6,612,970 | B2 | 9/2003 | Forcillo | 482/57 |
| 6,641,507 | B1 * | 11/2003 | Warner et al. | 482/63 |
| 7,175,570 | B2 | 2/2007 | Lull et al. | |
| 2002/0160887 | A1 | 10/2002 | Warner et al. | |
| 2003/0211918 | A1 | 11/2003 | Warner et al. | |
| 2005/0221962 | A1 | 10/2005 | Warner et al. | |

FOREIGN PATENT DOCUMENTS

| | | |
|---|---|---|
| AT | 209202 | 5/1960 |
| DE | 2436594 | 2/1976 |
| EP | 0 852 155 B1 | 7/1998 |
| FR | 328506 | 7/1903 |
| FR | 89009 | 4/1967 |
| FR | 89347 | 5/1967 |
| FR | 2003598 | 11/1969 |
| FR | 2108579 | 5/1972 |
| FR | 2500311 | 8/1982 |
| GB | 4221 | 0/1901 |
| GB | 1194046 | 6/1970 |
| GB | 1469363 | 4/1977 |
| WO | WO 02/072210 A1 | 9/2002 |

OTHER PUBLICATIONS

Picture: Reebok Studio Cycle, Date unknown.
Brochure: Nowadays ApS; "Spinning, Total Conditioning for the Body and the Soul", Date unknown.
Brochure: Schwinn Cycling & Fitness Inc., "Johnny G. Spinner, by Schwinn, Go Fast standing still", 4 pages, 1995.
Catalog: "Schwinn® Fitness Equipment", available as early as 1985.
Catalog: "Schwinn® Fitness Catalog", available as early as 1987.

Catalog: "Schwinn '88 Lightweight Bicycles", available as early as 1988.
Catalog: "1990 Schwinn Full-Line Fitness Catalog", 1990.
Catalog, "Schwinn Fitness", available as early as 1991.
Catalog: "The 1993 Schwinn Fitness Line", available as early as 1993.
Catalog: "93 New Bikes. New Thinking.", available as early as 1993.
Catalog: "Schwinn Fitness Equipment a change of shape", available as early as 1995.
Catalog: "Discover the Power Inside™, Schwinn 1995 fitness equipment", available as early as 1995.
Catalog: "LeMond™ RevMaster™", available as early as 2000.
Catalog: "Schwinn Fitness Equipment", date unknown.
Office Action, U.S. Appl. No. 08/919,695, mailed Oct. 26, 1998, 4 pages.
Response to Restriction Requirement and Election Requirement, U.S. Appl. No. 08/919,695, dated Dec. 18, 1998, 2 pages.
Notice of Allowance and Fee(s) Due, Notice of Allowability, Examiner's Comments and Reason's For Allowance, and Notice of References Cited, U.S. Appl. No. 08/919,695, mailed Mar. 16, 1999, 5 pages.
Preliminary Amendment, U.S. Appl. No. 09/379,560, dated Aug. 23, 1999, 15 pages.
Office Action, U.S. Appl. No. 09/379,560, mailed Sep. 22, 2000, 4 pages.
Response to Office Action, U.S. Appl. No. 09/379,560, dated Mar. 21, 2001, 2 pages.
Office Action and Notice of References Cited, U.S. Appl. No. 09/379,560, mailed Jun. 7, 2001, 5 pages.
Amendment Transmittal Letter and Terminal Disclaimer, U.S. Appl. No. 09/379,560, dated Oct. 9, 2001, 3 pages.
Notice of Allowance and Fee(s) Due, Notice of Allowability, Reasons For Allowance, and Interview Summary, U.S. Appl. No. 09/379,560, mailed Mar. 26, 2002, 4 pages.
Notice of Allowance and Fee(s) Due, Notice of Allowability, and Reasons For Allowance, U.S. Appl. No. 09/379,560, mailed Sep. 23, 2002, 3 pages.
Notice of Allowance and Fee(s) Due, Notice of Allowability, and Reasons For Allowance, U.S. Appl. No. 09/379,560, mailed Jun. 11, 2003, 3 pages.
Preliminary Amendment, U.S. Appl. No. 09/379,488, dated Aug. 23, 1999, 14 pages.
Office Action, U.S. Appl. No. 09/379,488, mailed May 15, 2001, 5 pages.
Response to Office Action, U.S. Appl. No. 09/379,488, dated Sep. 12, 2001, 2 pages.
Office Action and Notice of References Cited, U.S. Appl. No. 09/379,488, mailed Nov. 7, 2001, 7 pages.
Response to Office Action and Terminal Disclaimer, U.S. Appl. No. 09/379,488, dated Mar. 7, 2002, 3 pages.
Terminal Disclaimer, U.S. Appl. No. 09/379,488, dated Mar. 19, 2002, 1 page.
Notice of Allowance and Fee(s) Due, Notice of Allowability, Reasons For Allowance, U.S. Appl. No. 09/379,488, mailed Mar. 26, 2002, 4 pages.
Notice of Allowance and Fee(s) Due, Notice of Allowability, Reasons For Allowance, U.S. Appl. No. 09/379,488, mailed Jul. 29, 2002, 4 pages.
Notice of Allowance and Fee(s) Due, Notice of Allowability, Reasons For Allowance, U.S. Appl. No. 09/379,488, mailed Dec. 3, 2002, 4 pages.
Preliminary Amendment, U.S. Appl. No. 10/093,326, dated Jun. 25, 2002, 3 pages.
Office Action and Notice of References Cited, U.S. Appl. No. 10/093,326, dated Oct. 6, 2003, 5 pages.
Terminal Disclaimer, U.S. Appl. No. 10/093,326, dated Jan. 28, 2004, 2 pages.
Notice of Allowance and Fee(s) Due, Notice of Allowability, Reasons For Allowance, U.S. Appl. No. 10/093,326, mailed Apr. 7, 2005, 4 pages.
Supplemental Notice of Allowability, U.S. Appl. No. 10/093,326, dated May 23, 2005, 2 pages.
Office Action, U.S. Appl. No. 10/093,326, dated Feb. 24, 2006, 5 pages.
Amendment and Response to Office Action, and Terminal Disclaimer, U.S. Appl. No. 10/093,326, dated May 23, 2006, 5 pages.
Office Action, U.S. Appl. No. 10/093,326, mailed May 31, 2006, 5 pages.
Amendment and Response to Final Office Action and Terminal Disclaimer, U.S. Appl. No. 10/093,326, dated Oct. 2, 2006, 6 pages.
Notice of Allowance and Fee(s) Due, Notice of Allowability, and Response to Arguments, U.S. Appl. No. 10/093,326, mailed Nov. 30, 2006, 5 pages.
Office Action and Notice of References Cited, U.S. Appl. No. 10/461,588, mailed Dec. 19, 2005, 6 pages.
Amendment and Response to Office Action and three Terminal Disclaimers, U.S. Appl. No. 10/461,588, dated Apr. 19, 2006, 7 pages.
Office Action, U.S. Appl. No. 10/461,588, mailed Aug. 1, 2006, 4 pages.
Amendment and Terminal Disclaimer, U.S. Appl. No. 10/461,588, dated Oct. 31, 2006, 6 pages.
Office Action and Notice of References Cited, U.S. Appl. No. 10/461,588, mailed Jan. 25, 2007, 8 pages.
Amendment and Terminal Disclaimer, U.S. Appl. No. 10/461,588, dated Apr. 25, 2007, 7 pages.
Office Action and Notice of References Cited, U.S. Appl. No. 10/461,588, dated Jul. 20, 2007, 10 pages.
Office Action, U.S. Appl. No. 11/137,095, mailed Aug. 4, 2006, 4 pages.
Amendment and Response to Restriction Requirement, U.S. Appl. No. 11/137,095, Oct. 4, 2006, 4 pages.
Notice of Allowance and Fee(s) Due, Notice of Allowability, and Response to Arguments, U.S. Appl. No. 11/137,095, mailed Jan. 24, 2007, 4 pages.
Office Action and Notice of References Cited, U.S. Appl. No. 11/137,095, mailed Jul. 20, 2007, 6 pages.
Office Action and Notice of References Cited, U.S. Appl. No. 06/796,980, mailed Jul. 21, 1986, 4 pages.
Amendment, U.S. Appl. No. 06/796,980, dated Oct. 17, 1986, 7 pages.
Notice of Allowance, Notice of Allowability, and Examiner's Amendment, U.S. Appl. No. 06/796,980, mailed Feb. 18, 1987, 3 pages.
Amendment After Allowance Under 37 C.F.R. 1.312, U.S. Appl. No. 06/796,980, dated Feb. 24, 1987, 3 pages.
Response to Amendment After Allowance Under 37 C.F.R. 1.312, U.S. Appl. No. 06/796,980, dated Mar. 25, 1987, 1 page.
Notice of Allowability and Examiner's Amendment, U.S. Appl. No. 06/796,980, mailed May 6, 1987, 2 pages.

* cited by examiner

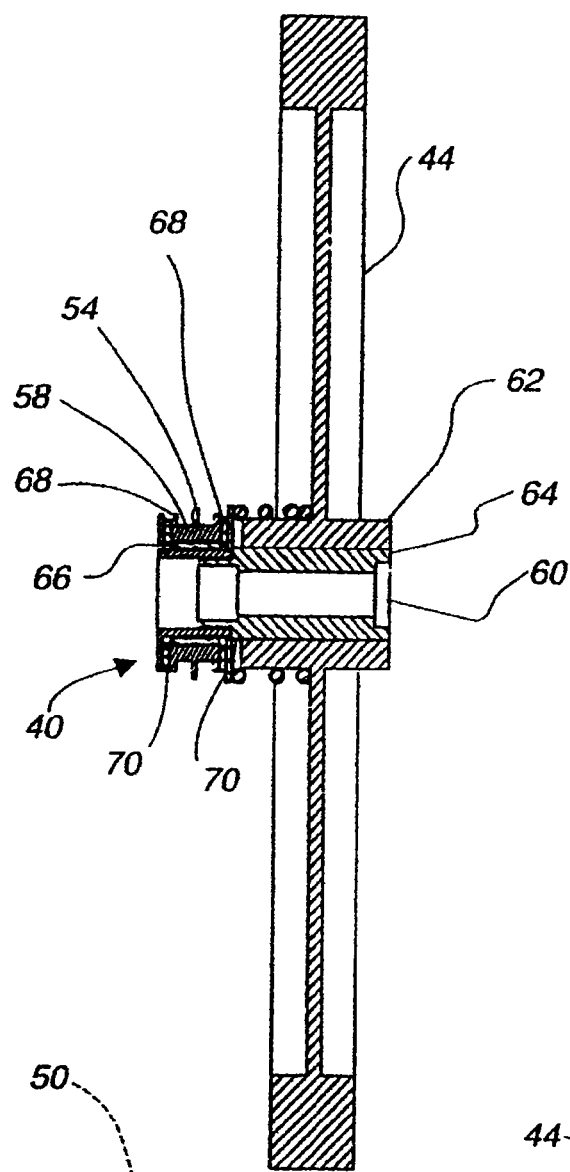
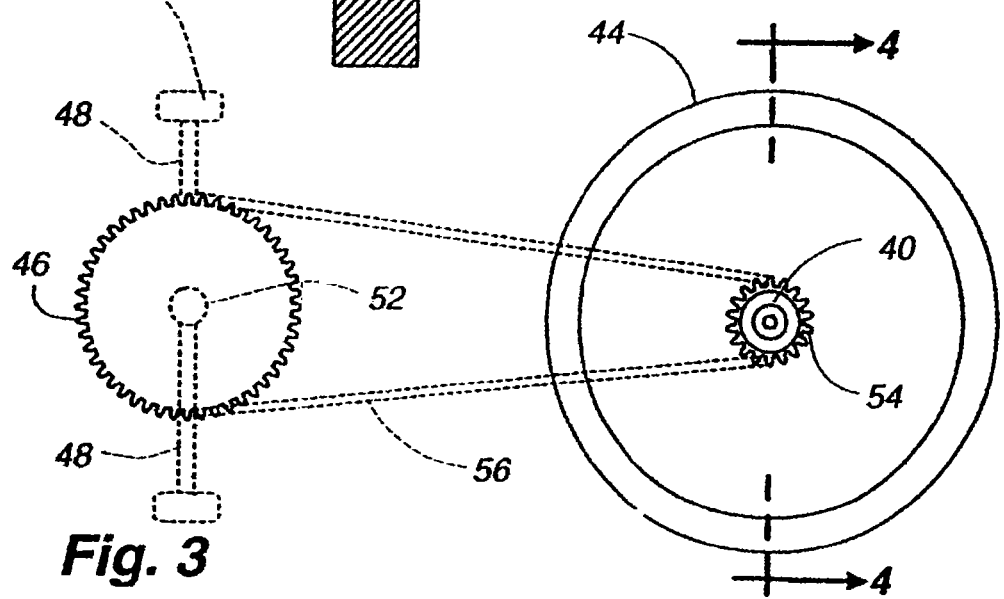

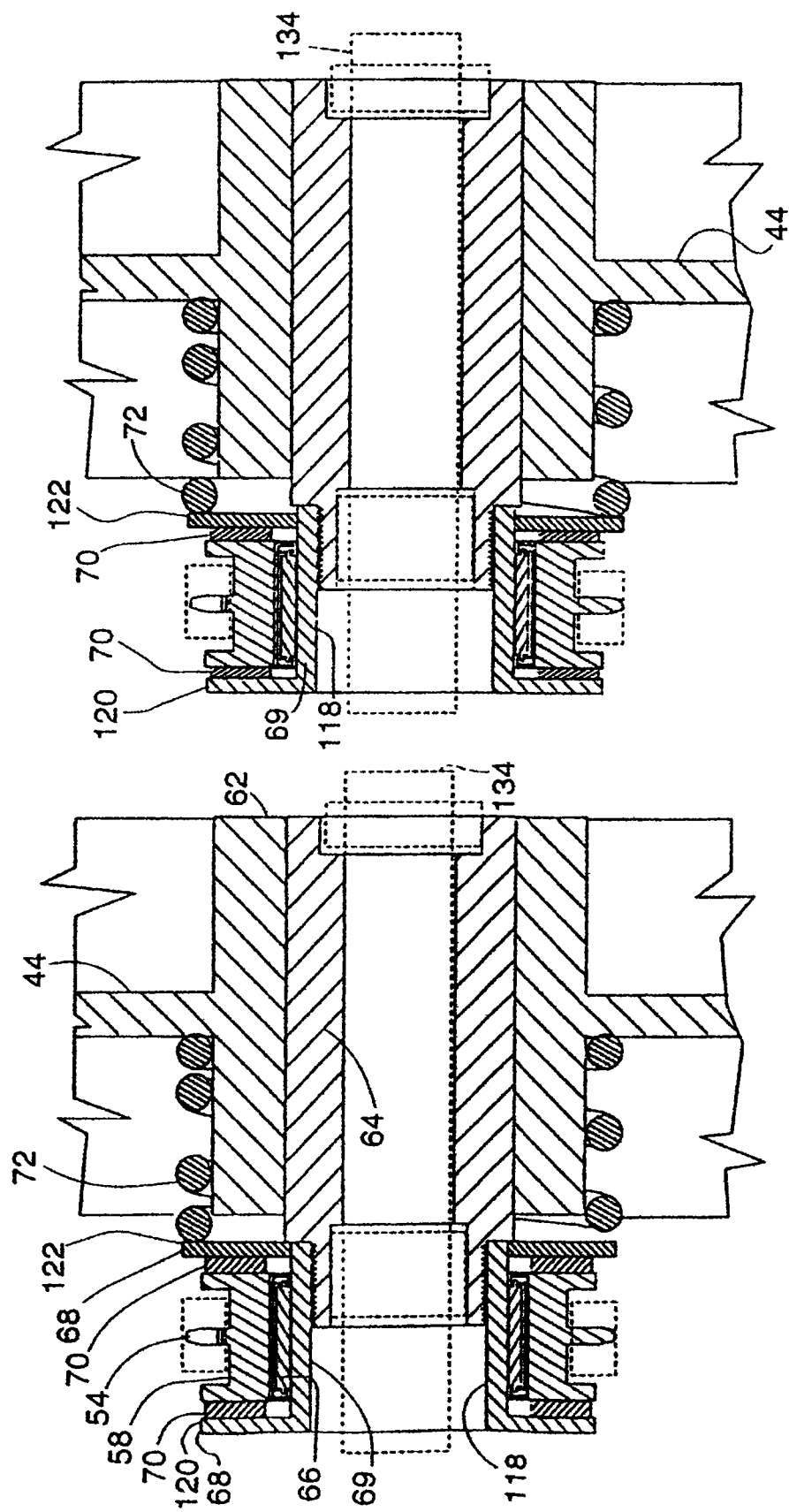

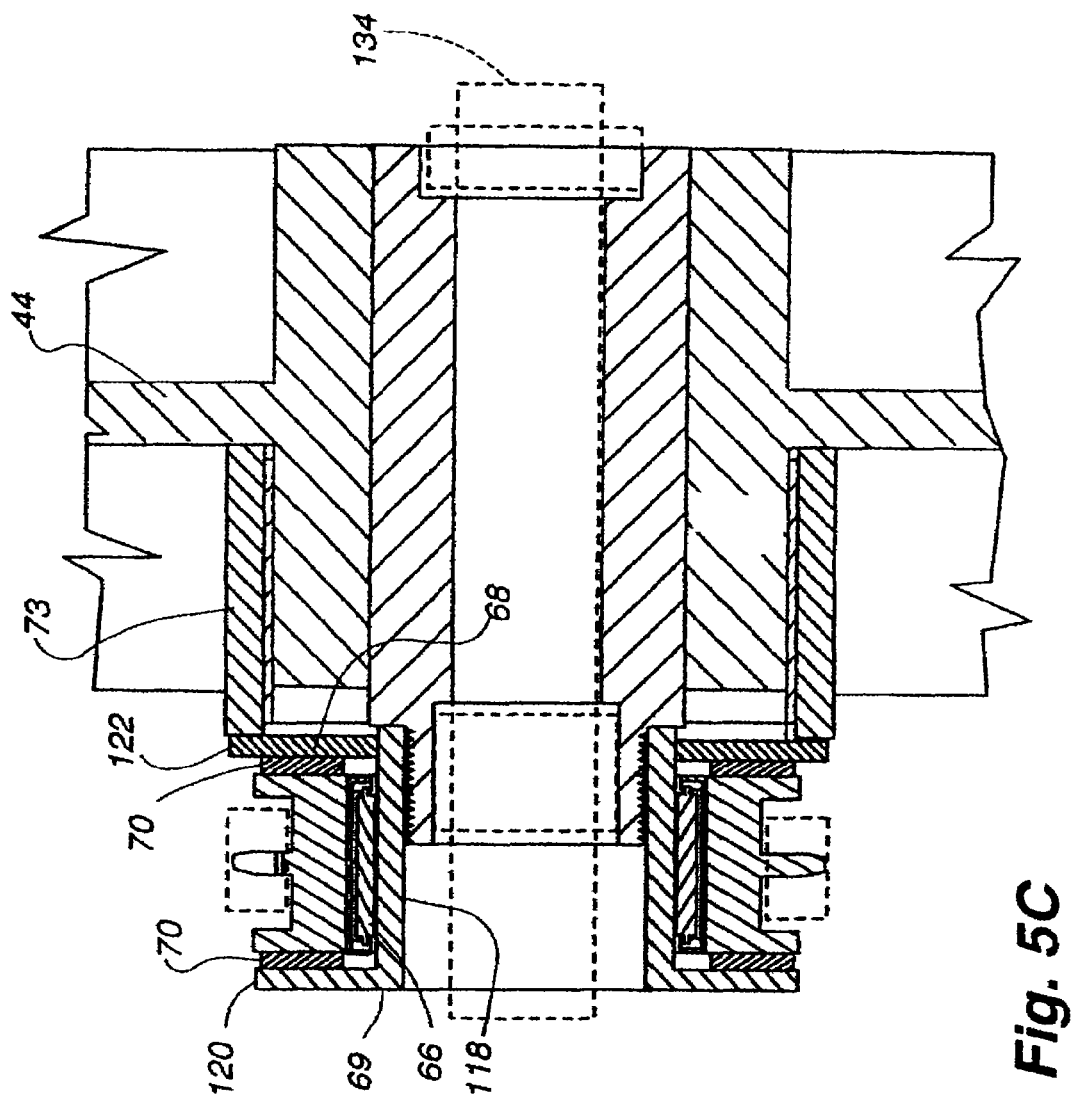

US 7,569,001 B2

FREE WHEEL CLUTCH MECHANISM FOR BICYCLE DRIVE TRAIN

CROSS REFERENCE TO RELATED APPLICATIONS

This application is a continuation-in-part application of application Ser. No. 09/379,560 entitled "Free Wheel Clutch Mechanism for Bicycle Drive Train" filed on Aug. 23, 1999, which is now U.S. Pat. No. 6,641,507, which is a continuation of application Ser. No. 08/919,695 entitled "Free Wheel Clutch Mechanism for Bicycle Drive Train" filed on Aug. 28, 1997, which is now U.S. Pat. No. 5,961,424, which claims the benefit of U.S. provisional application No. 60/038,726, entitled "Free Wheel Clutch Mechanism", filed on Feb. 18, 1997.

FIELD OF THE INVENTION

This invention relates generally to free wheeling devices, and more particularly to a free wheel clutch mechanism useful with crank operated exercise bicycles employing an inertia flywheel.

BACKGROUND

The benefit of exercising on a direct drive exercise bicycle is well known. Direct drive exercise bicycles typically utilize a high-inertia flywheel driven by a fixed-gear drive train. The flywheel is driven by the rider up to relatively high revolutions per minute (rpm). Because of the direct drive feature, the drive train must rotate at a fixed ratio of rpm as compared to the flywheel based on the gear ratio. One benefit of the direct drive exercise bicycle is that the direct drive gear train provides "pedal-through assistance" for the rider. The "pedal-through" feature assists the rider by pushing the pedal through the top and bottom dead center pedal positions to help make the transition smooth and efficient. Other benefits are derived from the direct drive interaction between the inertia flywheel and the crank arms to which the rider's feet are attached. The inertia flywheel provides a smooth, non-jerky pedaling rhythm which provides an efficient and rigorous exercise for the rider, especially at relatively high rpms, such as 60 to 100 rpm.

In the application of this invention to an inertia flywheel exercise bicycle, positive drive is required to rotate the inertia wheel in order to overcome regulated retardation torque applied by brake means used to provide resistance against which the rider/operator works. The inertia wheel provides means for continued drive train (wheel to crank to leg) movements during those periods when the crank is in top dead center or bottom dead center positions, where the rider's legs are somewhat weaker in providing rotary motion to the activating crank arms. The flywheel affords smooth and steady operation for the rider.

The direct drive relationship between the flywheel and the drive train is also a drawback of exercising on this type of bicycle. The direct drive relationship is inconvenient when the rider wishes to quickly stop the pedals, or loses the pedaling rhythm required to keep up with the rotating flywheel. In the usual flywheel exerciser employing such a direct drive relationship, it is necessary for the rider/operator to gradually decrease his cranking rate in order to slow down the inertia wheel. The rider cannot suddenly stop pedaling inasmuch as the inertia flywheel continues to drive the crank arms.

Of similar importance is the desirability of providing pedal assist to the rider/operator's legs when cranking at a speed slower than that necessary to positively drive the flywheel, and providing for a gradual reengagement and lockup between the pedal actuated drive shaft and the free wheeling flywheel in order to avoid abrupt impact when reengaging the moving flywheel.

It is with these issues in mind that the present invention was developed.

SUMMARY OF THE INVENTION

The present invention in general terms concerns a clutch mechanism for use on an exercise bicycle, and consequently, the present invention recognizes that it is desirable to have a free wheeling mechanism for an exerciser of the inertia flywheel type which provides means for selectively disengaging the flywheel from the drive means. The clutch mechanism allows for the beneficial direct-drive connection between the drive train and the flywheel, and also allows the drive train and flywheel to move independently from one another, or "break free", when a sufficient force is applied to the drive train or the flywheel.

In general, the invention is an exercise bicycle including a frame having a seat and handlebars, a high-inertia flywheel having a hub at a center of rotation, the flywheel being rotatably supported on the frame at the hub, and a drive train including a drive sprocket, a crank arm attached to and extending from the drive sprocket, and a pedal attached to the crank arm, the drive train being rotatably supported by the frame. The drive train also includes a slave sprocket fixed to the flywheel at the hub, with the drive and slave sprockets connected in a direct-drive relationship, the drive train driveable in a forward and rearward directions to cause the flywheel to rotate. A clutch mechanism is positioned in engagement with the slave sprocket and the hub to create a frictional engagement between the sprocket and the hub, and to establish a break-free force. When the drive train is actuated in the forward direction, the slave sprocket and the hub move together under a mechanical engagement, and when the drive train is actuated in the rearward direction under the influence of a force greater than the break-free force, the clutch mechanism slips between the slave sprocket and the hub, allowing the slave sprocket and the flywheel to move independently of one another. There is no mechanical engagement between the sprocket and the hub in the rearward direction as there is in the forward direction, established by the one-way bearing.

More specifically, the slave sprocket defines a sprocket collar mounted on the hub and also includes an engagement collar. A one-way bearing is mounted between the sprocket collar and the hub to allow the sprocket collar to drive the hub when the sprocket collar is driven in a forward direction, and to allow the sprocket collar to spin independently of the hub when the sprocket collar is driven in the rearward direction. An engagement flange fixedly mounted on the hub corresponds to the engagement collar, and compression means are mounted on the flywheel to bias the flange and the collar towards one another. A clutch material member is positioned between the engagement flange and the collar, and is clamped therebetween by the compression means to cause the engagement flange to move in conjunction with the sprocket collar. The engagement creates a break-free force required to cause the sprocket collar to move independently of the engagement flange. When the drive train is actuated in the forward direction, the sprocket collar and the engagement flange move together, and when the drive train is actuated in the rearward direction and overcomes the break-free force, the engagement flange slips with respect to the collar, allowing the sprocket collar and the flywheel to move independently of one another.

In another embodiment, the slave sprocket defines a sprocket collar mounted on the hub and defines an inner and outer engagement collars. A one-way bearing is mounted between the sprocket collar and the hub to allow the sprocket collar to drive the hub when the sprocket collar is driven in a forward direction, and to allow the sprocket collar to spin freely on the hub when the sprocket collar is driven in the rearward direction. An inner engagement flange is fixedly mounted on the hub corresponding to the inner engagement collar, and an outer engagement flange is fixedly mounted on the hub corresponding to the outer engagement collar. Compression means are mounted on the flywheel to bias the inner flange and the inner collar towards one another, and to bias the outer flange and the outer collar towards one another. A clutch material member is positioned between the outer engagement flange and the outer collar, and between the inner engagement flange and the inner collar, and clamped therebetween by the compression means to cause the inner and outer engagement flanges to move in conjunction with the sprocket collar. The engagement creates a break-free force required to cause the sprocket collar to move independently of inner and outer engagement flanges. When the drive train is actuated in the forward direction, the sprocket collar and the inner and outer flanges move together, and when the drive train is actuated in the rearward direction and overcomes the break-free force, the inner and outer engagement flanges slip with respect to the inner and outer collars, allowing the sprocket collar and the flywheel to move independently of one another. There are other embodiments of the invention disclosed which perform the same function with very similar structure.

Also, the invention includes an exercise bicycle frame for use with the clutch mechanism. The frame includes a front support, a rear support, and a brace member extending between the front and rear ground supports. In addition, front forks are included that have a top end and a bottom end, and are attached at the bottom end to the front ground support. The front forks rotatably support a high-inertia flywheel. A rear post is included that has a top member and a bottom member, the top member attaching to the bottom member in a rear offset overlapping manner, the rear post defining a top end and a bottom end. The rear post is attached at the bottom end to the brace member. An articulated beam is attached to and extends from the top end of the front forks downwardly and rearwardly to a midpoint between the front forks and the rear post, then extends horizontally to the rear post at the intersection of the top and bottom members of the rear post. A rear truss extends from the top member of the rear post to the rear support. A handlebar is attached at the top end of the front forks, and a seat is attached at the top end of the rear post. A front area is defined by the front forks, articulated beam, rear post and brace member forming a five-sided polygon, and a rear area is defined by the rear post, rear truss, and brace member forming a five-sided polygon.

Accordingly, it is a primary object of the present invention to provide a freewheeling clutch mechanism that allows an exercise bike to include the direct-drive relationship between the drive train and the flywheel, and at the same time allow the drive train and the flywheel to turn independently from one another under certain conditions.

Other aspects, features and details of the present invention can be more completely understood by reference to the following detailed description in conjunction with the drawings, and from the appended claims.

BRIEF DESCRIPTION OF THE DRAWINGS

FIG. 3 is a schematic representation of the drive train of the exercise bicycle shown in FIG. 1.

FIG. 4 is a section taken along line 4—4 of FIG. 3.

FIG. 5A is a section taken along line 5A—5A of FIG. 2

FIG. 5B is a representative section similar to FIG. 5A showing the effects of worn clutch material.

FIG. 5C is a representative section similar to FIG. 5A showing a different type of compression member.

DETAILED DESCRIPTION OF THE PREFERRED EMBODIMENT

Figure 1:
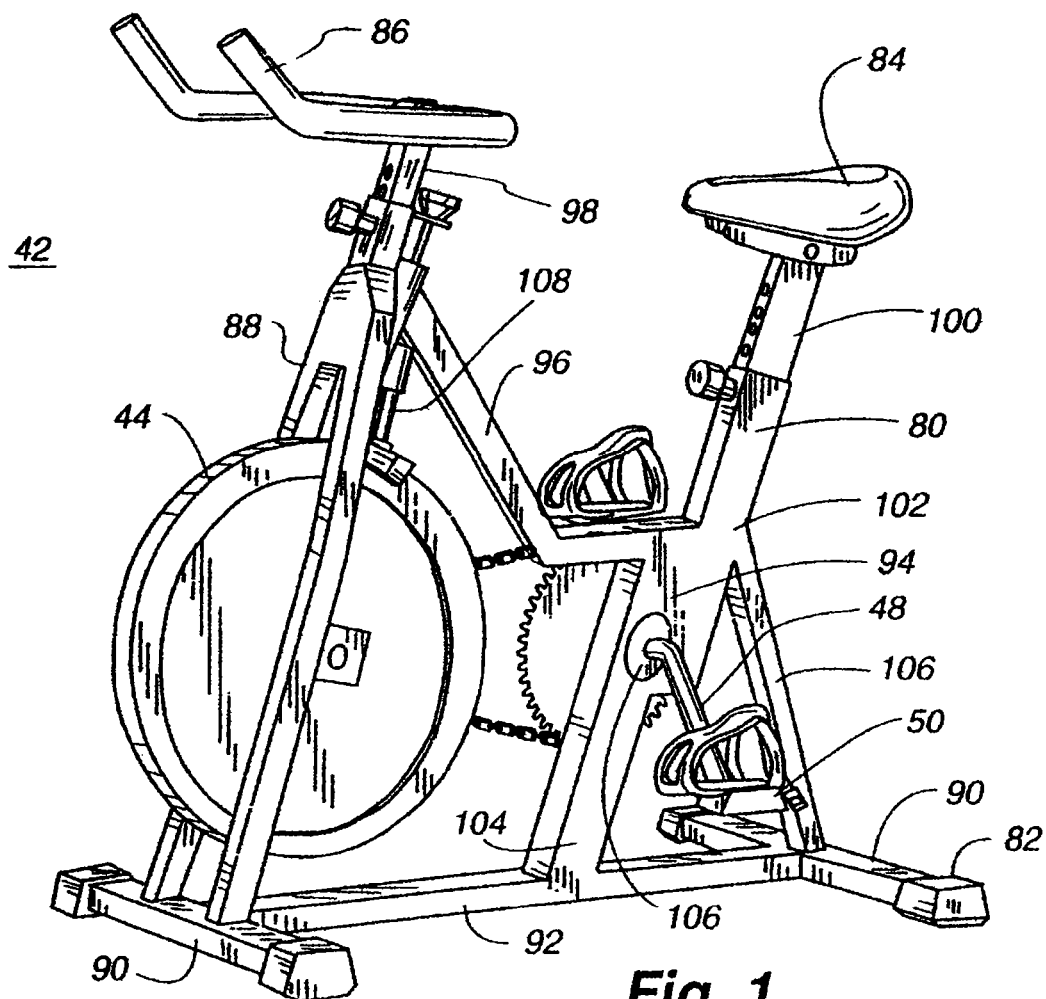
FIG. 1 is a perspective view of an exercise bicycle incorporating the clutch mechanism of the present invention.

In light of the above items, a free wheel clutch mechanism 40 has been developed for use on direct-drive exercise bicycles 42 utilizing an inertia flywheel 44 (FIGS. 1–4). While the present invention is described below associated with an exercise bicycle, it is contemplated that it could be used on normal bicycles or other exercise equipment, including magnetic resistive bicycles, air-resistance bicycles and other non-bicycle exercisers (such as upper body exercisers), each having rotary-driven mechanisms (wheels, etc.), in the proper circumstances. The free wheel clutch mechanism works in a direct-drive manner when the rider pedals the bicycle in the forward direction (counter-clockwise in FIGS. 1 and 2, clockwise in FIG. 3), but has a release, or free wheel, characteristic when the rider applies a required force on the pedal (or to the drive train somewhere) opposite or against the forward pedaling direction. Upon application of the appropriate opposite force ("break free force threshold"), the drive train free-wheels to allow the pedals to turn in the opposite direction with respect to, or more slowly than, the rotation of the flywheel. The rider can then either simply drive the pedals at a relatively lower rpm than the normal gear ratio to the flywheel, stop the pedals, or can rotate the pedals backwards.

The opposite force required to be applied to the pedals to cause the free wheeling action can be adjusted based on the design of the free wheel clutch mechanism, and is typically between 0.00 and 100 pounds, preferably 55 pounds at the pedals, depending on the application. The break free force threshold is based on the static frictional engagement between the clutch material and the clutch plates which the clutch material is clamped between, as well as the mechanical advantage provided through the drive train. The clutch plates, as defined below, are on different members that in normal circumstances are to rotate together. The friction force between the clutch material and the clutch plates facilitates this relationship. At a certain point (the break free force threshold), the opposing clutch plates overcome the static frictional force and spin at different speeds (r.p.m.'s) in the same direction, or in the opposite direction. The surface area of the clutch plates and the clutch plate material, the material property of the clutch plates and the clutch material, and the force at which the clutch plates clamp the clutch material are all factors that can be specifically designed to affect the break free force threshold. The break free force (as measured at the pedal) is affected also by the gear ratio and the length of the crank-arms.

The free wheel clutch mechanism 40 is integral to the drive train of the exercise bicycle. The drive or gear train includes the drive sprocket 46, the crank arms 48 and associated pedals 50 attached to the drive sprocket, the drive axle assembly 52, the slave sprocket 54, and the chain or belt 56 that interconnects the drive and slave sprockets, as shown in FIG. 3. Typically, the drive sprocket is rigidly mounted to one of the crank arms, and each crank arm is removably mounted to the drive axle assembly. The drive axle assembly is positioned in the hub on the frame to allow rotating movement, in either direction of the crank arms.

As shown in FIG. 4, the free wheel clutch mechanism 40 includes a sprocket collar 58 rotatably mounted on a slave axle assembly 60. The slave sprocket 54 is attached to the flywheel 44 adjacent to the hub 62. The slave axle assembly is mounted in the hub, and attaches to the frame to allow the flywheel to rotate with respect to the frame, under the force of the drive train through the movement of the slave axle assembly. The slave axle assembly is actually mounted in the hub, and includes an axle housing. Typically, the slave sprocket is mounted on the axle housing.

The free wheel clutch mechanism can be mounted in association with the drive sprocket, cranks and drive axle assembly, or can be mounted in association with the slave sprocket, slave axle assembly and flywheel. The placement of the free wheel clutch mechanism is a matter of choice dependent on the particular implementation. The only difference between the two positions of the free wheel clutch mechanism is that when mounted in association with the slave sprocket, the actuation of the free wheel clutch mechanism affects the movement of the chain and drive sprocket (slow down, stop or reverse). When the free wheel clutch mechanism is mounted in association with the drive sprocket, the actuation of the free wheel clutch mechanism allows the pedals and cranks to be slowed down, stopped, or reversed while the drive sprocket, chain and slave sprocket and flywheel continue to rotate. As described herein, the free wheel clutch mechanism is mounted in association with the slave sprocket.

More specifically as shown in FIGS. 4 and 5A, the free wheel clutch mechanism includes a sprocket collar 58 (in this case a "slave" sprocket collar) that is mounted in a one-way drive relationship with the axle housing 64 such that the rotation of the slave sprocket collar in one direction directly drives the axle housing, and the rotation of the slave sprocket collar in the reverse direction does not drive the axle housing (allows "free wheeling"). This free wheeling relationship is established by one-way bearings 66 or a ratchet and pawl structure used between the slave sprocket collar and the axle housing.

The free wheeling motion of the slave sprocket collar 58 with respect to the axle housing 64 (and hence hub 62 and flywheel 44) is tempered, or reduced, by clutch plates 68 and clutch or braking material 70 acting upon the slave sprocket collar. A clutch plate collar 69 is secured to the axle housing 64 to fixedly position one end of the free wheel clutch mechanism 40. The clutch plates 68 are rigidly mounted to turn with the axle housing (and hence the hub and flywheel), and are forced into contact with the sprocket collar 58 by a biasing means, such as a spring member 72. The braking material 70 is positioned between the sprocket collar and the clutch plates to provide a frictional interface between the two. The braking material can be mounted to either the sprocket collar, the clutch plates, or can be free-floating. The area of contact between the clutch plate and the sprocket collar (through the braking material) in combination with the compression force applied by the biasing means 72, creates the "break free" force required to be applied through the sprocket collar to allow the sprocket collar to "free wheel" on the axle housing. If the applied force is not sufficient to overcome the "break free" force, then the sprocket collar is not able to free wheel on the axle housing.

The free wheeling clutch mechanism is self-adjusting under the bias force to accommodate for the reduction in thickness of the braking material 70 wearing out through use. The clutch plates 68 "float" on the axle housing to adjust and maintain contact with the sprocket collar as the braking material becomes thinner.

Particular embodiments of the free wheeling clutch mechanism are described in more detail below.

An exercise bicycle 42 incorporating the present invention is shown in FIG. 1. The bicycle includes a frame 80 supported on a support surface by ground engagement members 82, an adjustable seat 84, adjustable handlebars 86, a flywheel 44 rotatably positioned between a pair of front forks 88 of the frame, and a gear train 54 attached to the frame adjacent to and below the seat.

The frame 80, as shown in FIG. 1, includes front and rear ground supports 90 attached by a horizontal frame brace member 92 extending there between, front forks 88, and a rear post 94. The front forks and rear post are attached by an articulated beam 96 sloping from the top of the front forks down to approximately midway between the front forks and the rear post, at which point the articulated beam extends horizontally rearwardly to engage the rear post. The articulated beam thus includes two members connected at an angle to one another, and extends between the top of the forks to the approximate midpoint of the rear post.

An aperture is formed at the top of the forks to receive a handlebar post 98, the handlebar post being vertically adjustable in the top of the forks by a pop-pin structure, as is known in the industry. Handlebars are attached to the top of the handlebar post in any known manner for use by the rider. An aperture is formed in the top of the rear post for receiving a seat post 100. The seat post is vertically adjustable in the rear post by a pop-pin structure, as is well known in the art. The seat can be forwardly and rearwardly adjusted on the seat post, such as by the mechanism disclosed in U.S. Pat. No. 4,772,069 to Szymski, incorporated herein by reference, in addition to being vertically adjustable.

The rear post 94 includes a top member 102 and a bottom member 104. The top member 102 is attached to extend from the rear side of the bottom member 104, and extends beyond the top of the bottom member 104 in a rear-offset overlapping manner. The articulated beam 96 is affixed to the rear post 94 at the top of the bottom member 104 and the front side of the top member 102. This attachment of the articulated beam to the rear post forms a strong structural connection.

The crank arms 48 for each of the pedals 50 are attached to a hub 106 which is supported by the rear post at a location along the height of the rear post where the bottom and top members of the rear post coextend. The rear post 94 attaches to the horizontal frame member 92 about midway between the front and rear ground support members 90. A rear truss 107 extends at an angle from the rear post 94 down to the rear ground support member 90 for added strength. The frame is constructed of rectangular or hollow cylindrical steel tubing, as is known in the art. Rectangular tubing is preferred.

The front area defined by the forks 88, articulated beam 96, rear post 94, and horizontal frame member 92 is a five-sided polygon. The rear area defined by the rear post 94, rear truss 107 and horizontal frame member 92 is also a five-sided polygon. A friction break 108 is mounted adjacent to the top of the front forks to selectively engage the opposing outer rims of the flywheel 44 to provide an additional friction load against which the rider must work in exercising on the exercise bicycle. This frame design, to the geometry of the frame structure, is very strong and durable, and is capable of withstanding the rigors of frequent use. The portion of the frame that supports the crank arms and chain ring is especially strong and durable in this design as a result of the overlapped construction of the rear post 94.

Figure 2:
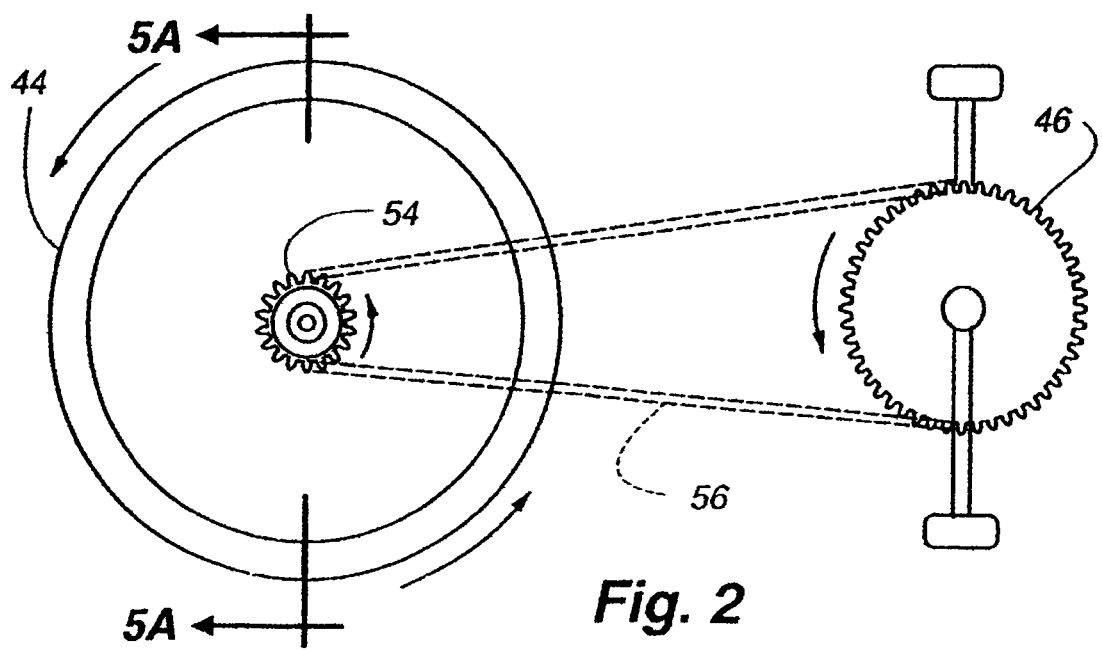
FIG. 2 is a schematic representation of the drive train of the exercise bicycle shown in FIG. 1.
Figure 6:
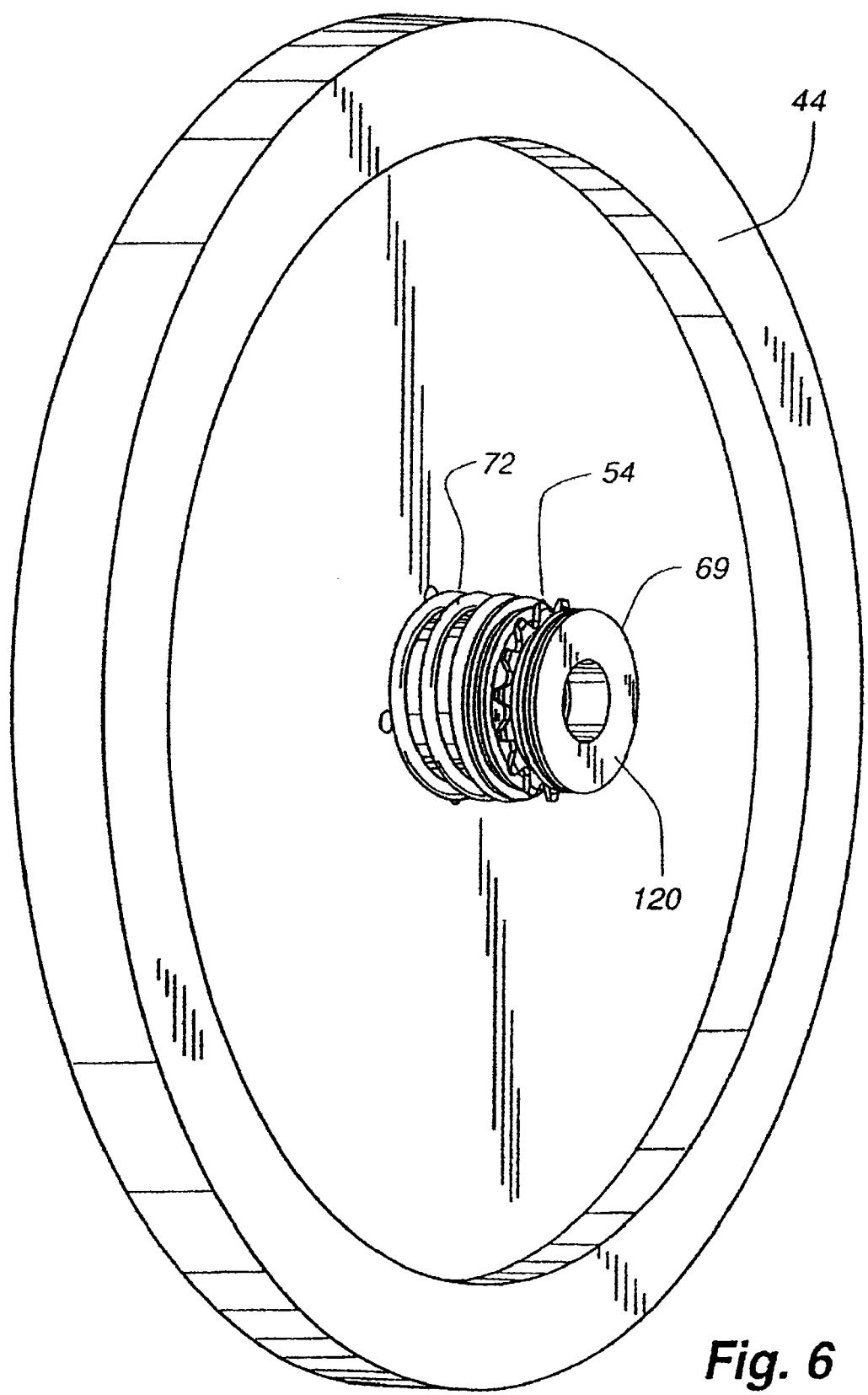
FIG. 6 is a perspective view of a high-inertia flywheel incorporating one embodiment of the clutch mechanism of the present invention.

As shown in FIGS. 1, 2 and 3, the drive or gear train (as described above) includes a drive sprocket 46 rotatably mounted on the frame, crank arms 48 and associated pedals 50 attached to the drive sprocket for driving the drive sprocket, a free wheel clutch assembly 40, a slave sprocket 54 attached on the flywheel 44, and a chain 56 connecting the drive sprocket to the slave sprocket, and to the free wheel clutch assembly. The chain could be replaced by a belt with accommodating modifications made to the drive and slave sprockets, with no adverse affect on the operation of the free-wheeling clutch mechanism of the present invention.

As with a standard direct drive exercise bicycle, the rider pedals the exercise bicycle using the crank arms and pedals, to drive the drive sprocket 46. The chain 56, engaged between the drive sprocket and slave sprocket 54, causes the flywheel 44 to rotate at the given rpms based on the gear ratio between the drive sprocket and the slave sprocket.

The free wheel clutch mechanism 40 engages the flywheel, as is described below, to allow the transfer of rotational movement from the slave sprocket 54 to the flywheel 44 in a direct-drive relationship when driven in the forward direction. Normal pedaling circumstances include the use of the exercise bicycle during an organized exercise class or individually, and include starting at 0.00 rpms and increasing and decreasing the rpms as is required or desired for certain exercise programs, whether the rider is standing, sitting or alternating during use. The free wheel clutch mechanism 40 of the present invention maintains the "pedal-through" benefit of standard direct drive exercise bicycles. The pedal-through benefit helps the rider pedal continuously and smoothly through the top and bottom pedal positions where riders typically are weakest.

The free wheel clutch mechanism 40 converts the direct drive relationship between the pedal revolutions and the flywheel revolutions to a "free wheel" relationship to allow the pedals 50 to be stopped, reversed in direction, or rotated more slowly than the flywheel 44, when a sufficient force is applied in the reverse direction to either of the pedals or anywhere on the drive train (where the clutch mechanism is positioned on the inertia wheel). Examples of the application of an opposite force include, but are not limited to, the intentional application of the reverse force by the rider while pedaling, for instance due to fatigue, or the contact of the pedal on the rider's lower leg when a foot is accidentally released from the pedal.

As shown in FIGS. 4, 5A, 5B, 6 and 7, the free wheel clutch mechanism 40 mounts on the slave axle assembly 60 adjacent to the hub 62 of the flywheel 44. A cylindrical slave axle housing 64 is press-fit into a cylindrical axial bore formed through the hub 62 of the flywheel. The end of the axle housing extending from the hub is externally threaded to receive the clutch plate collar 69.

In the description below, the terms "inside" and "inner" refer to the end closest to the flywheel 44, and the terms "outside" and "outer" refer to the end farthest from the flywheel. The clutch plate collar 69 includes a hollow cylindrical main body 118 with internal threads at one end for engagement with the external threads on the outer end of the axle housing 64. The clutch plate collar 69 has an outer radially extending engagement flange 120 attached to the outside end of the cylindrical main body 118, and an inner radially extending engagement flange 122 moveably attached to the inside end of the cylindrical main body.

Figure 7:
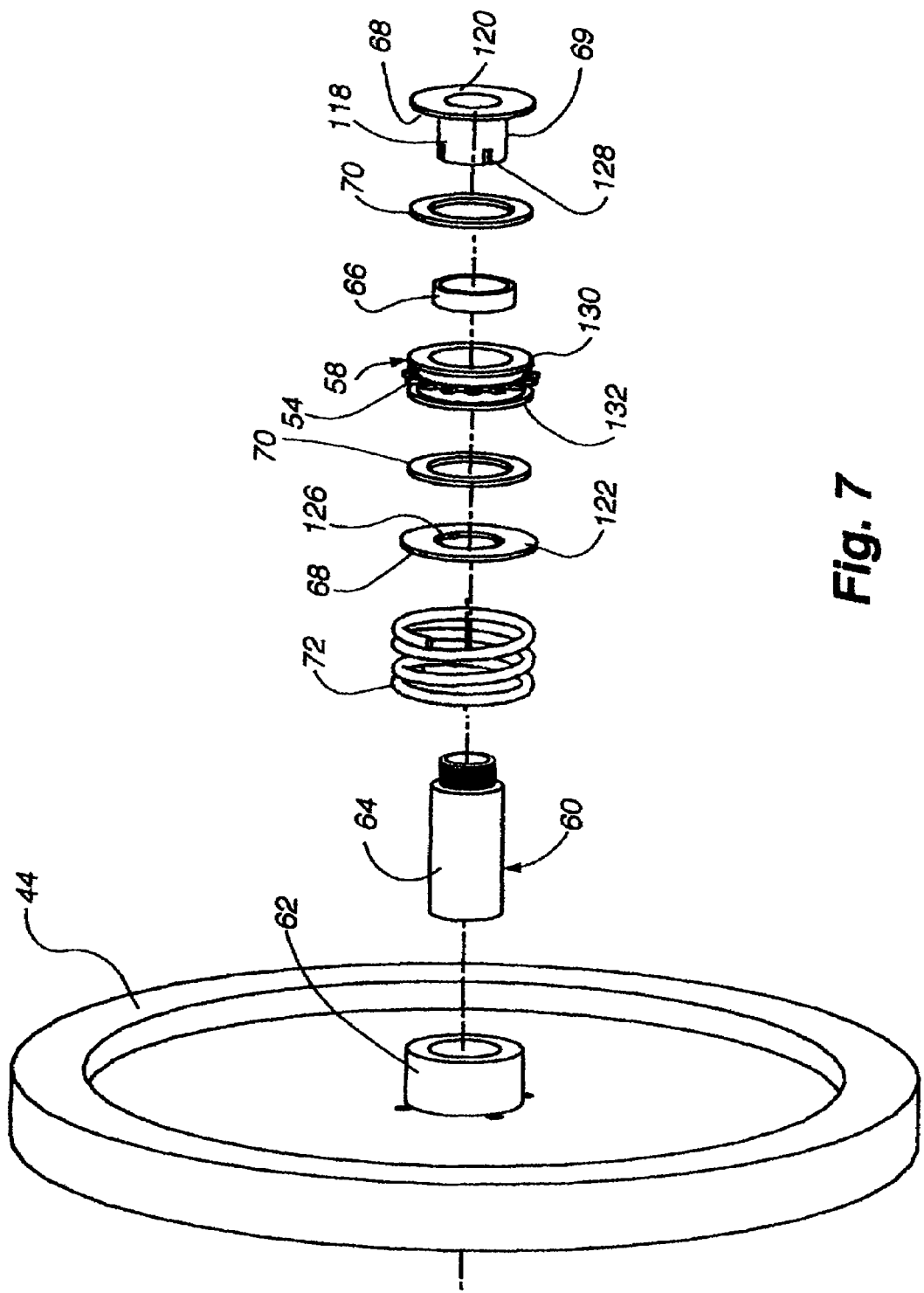
FIG. 7 is an exploded view of the flywheel of FIG. 6.
Figure 8:
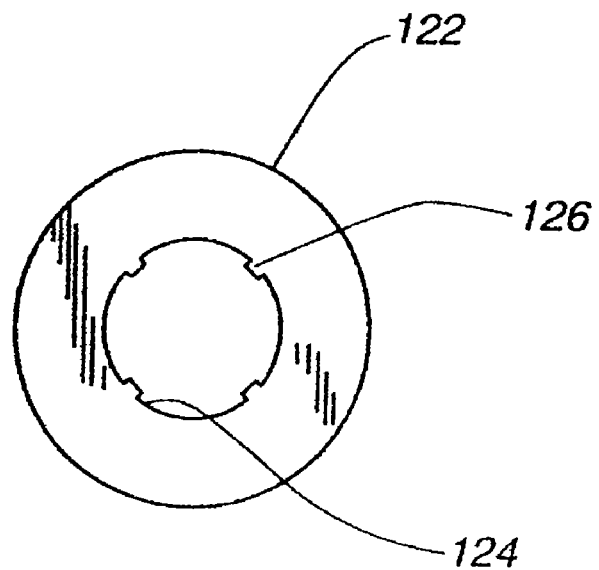
FIGS. 8 and 9 are elevation and perspective views, respectively, of a portion of the clutch mechanism.
Figure 9:
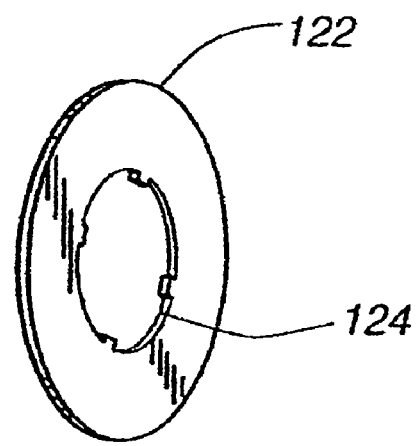
Figure 10:
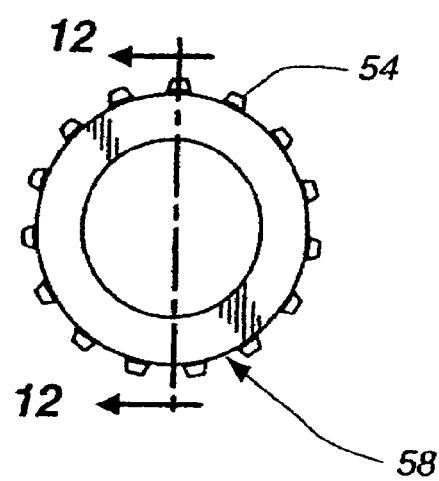
FIG. 10 is a side view of the sprocket collar member of the clutch mechanism of the present invention.
Figure 11:
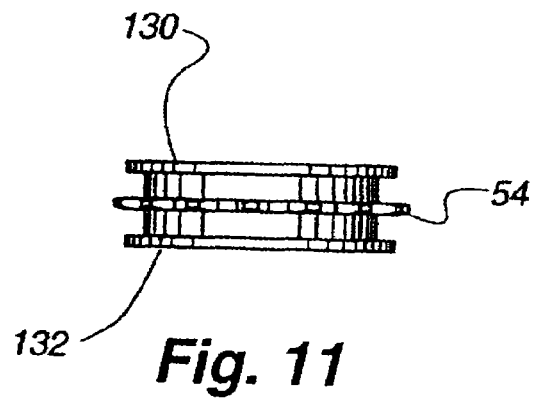
FIG. 11 is a top view of the sprocket collar shown in FIG. 10.
Figure 12:
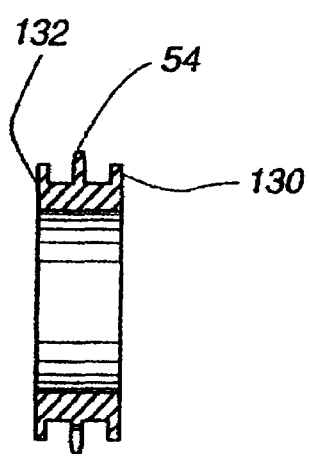
FIG. 12 is a section taken along line 12—12 of FIG. 10.
Figure 13:
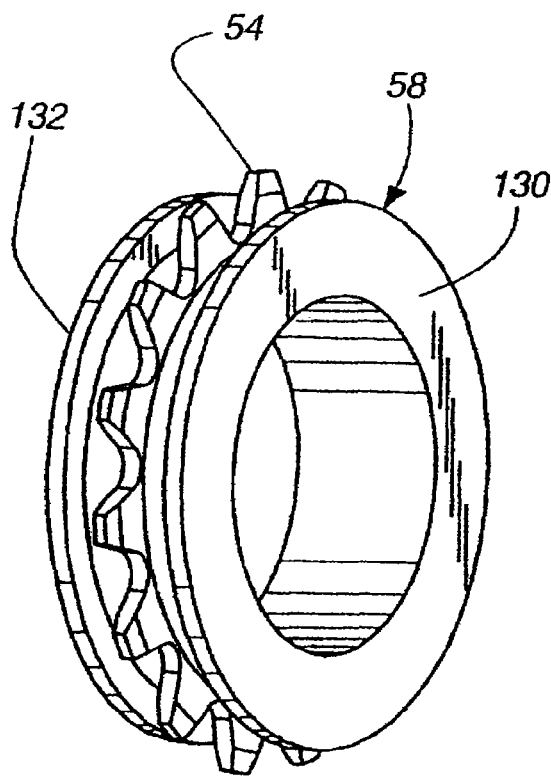
FIG. 13 is an enlarged front perspective view of the sprocket collar of FIG. 10.
Figure 14:
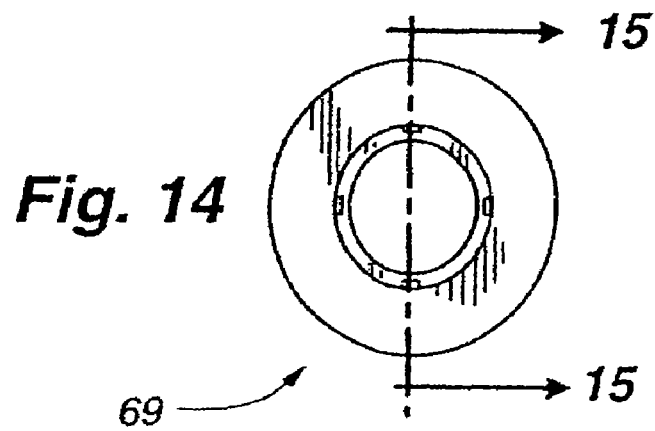
FIG. 14 is a side view of the clutch plate collar member of the clutch mechanism of the present invention.
Figure 15:
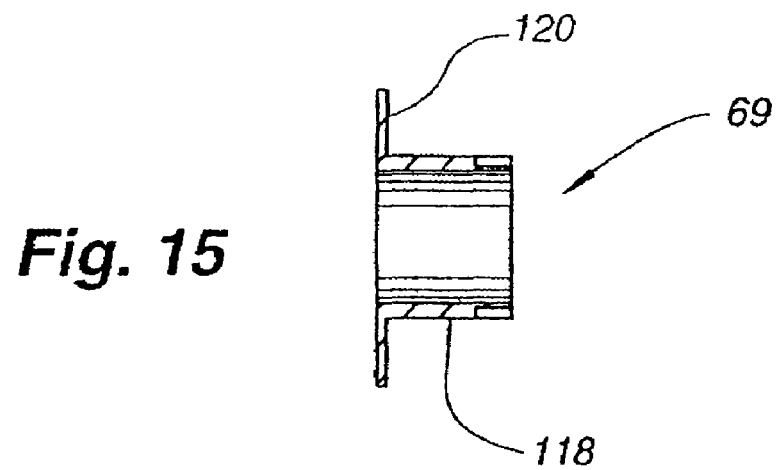
FIG. 15 is a section taken along line 15—15 of FIG. 14.
Figure 16:
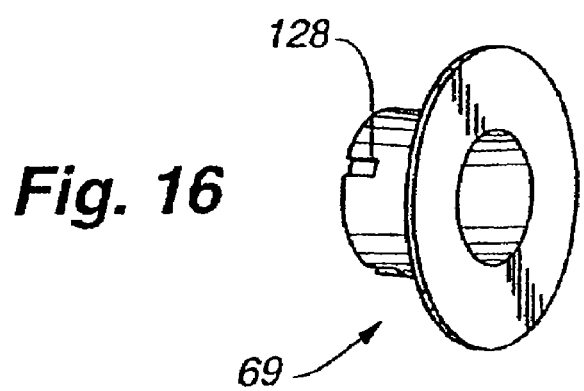
FIG. 16 is a front perspective view of the clutch plate collar member of the clutch mechanism of the present invention.
Figure 18:
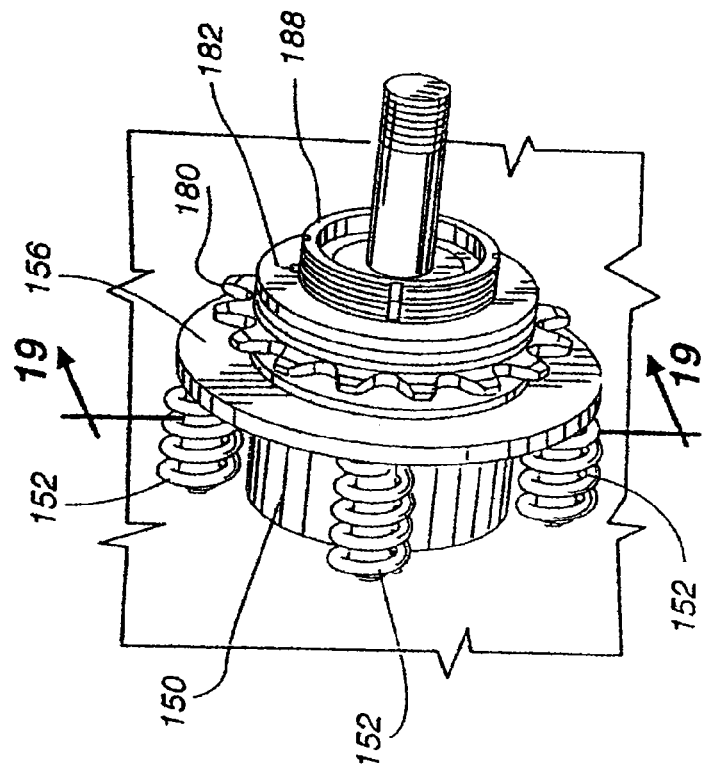
FIG. 18 is an enlarged perspective view of the embodiment of the present invention as shown in FIG. 17.
Figure 17:
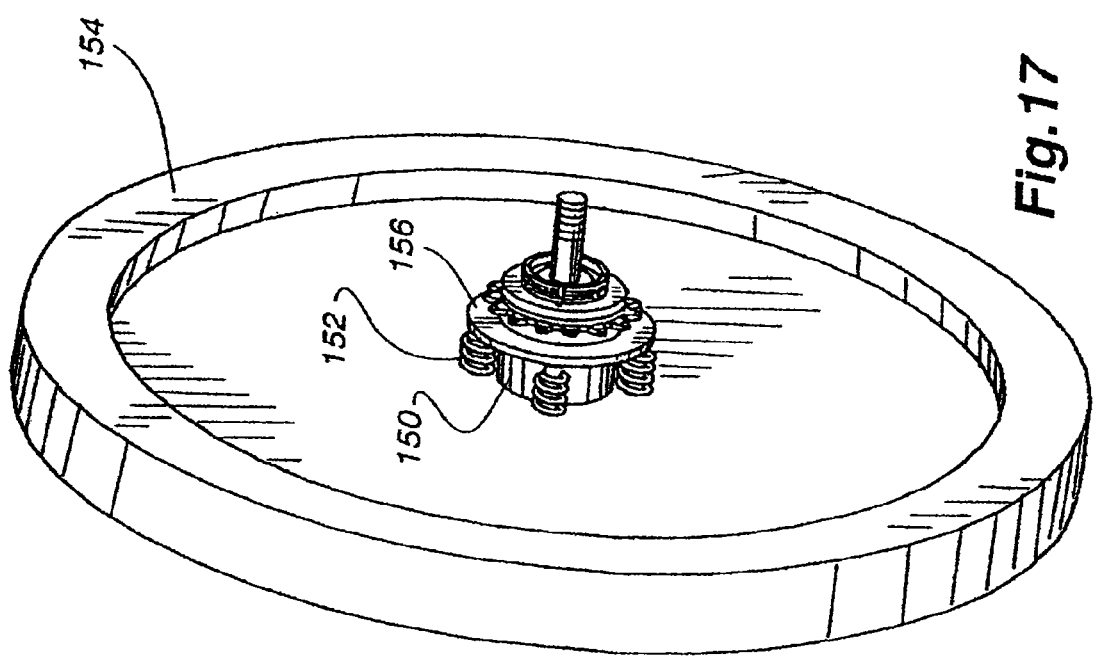
FIG. 17 is a perspective view of a high-inertia flywheel incorporating an alternative embodiment of the clutch mechanism of the present invention.
Figure 19:
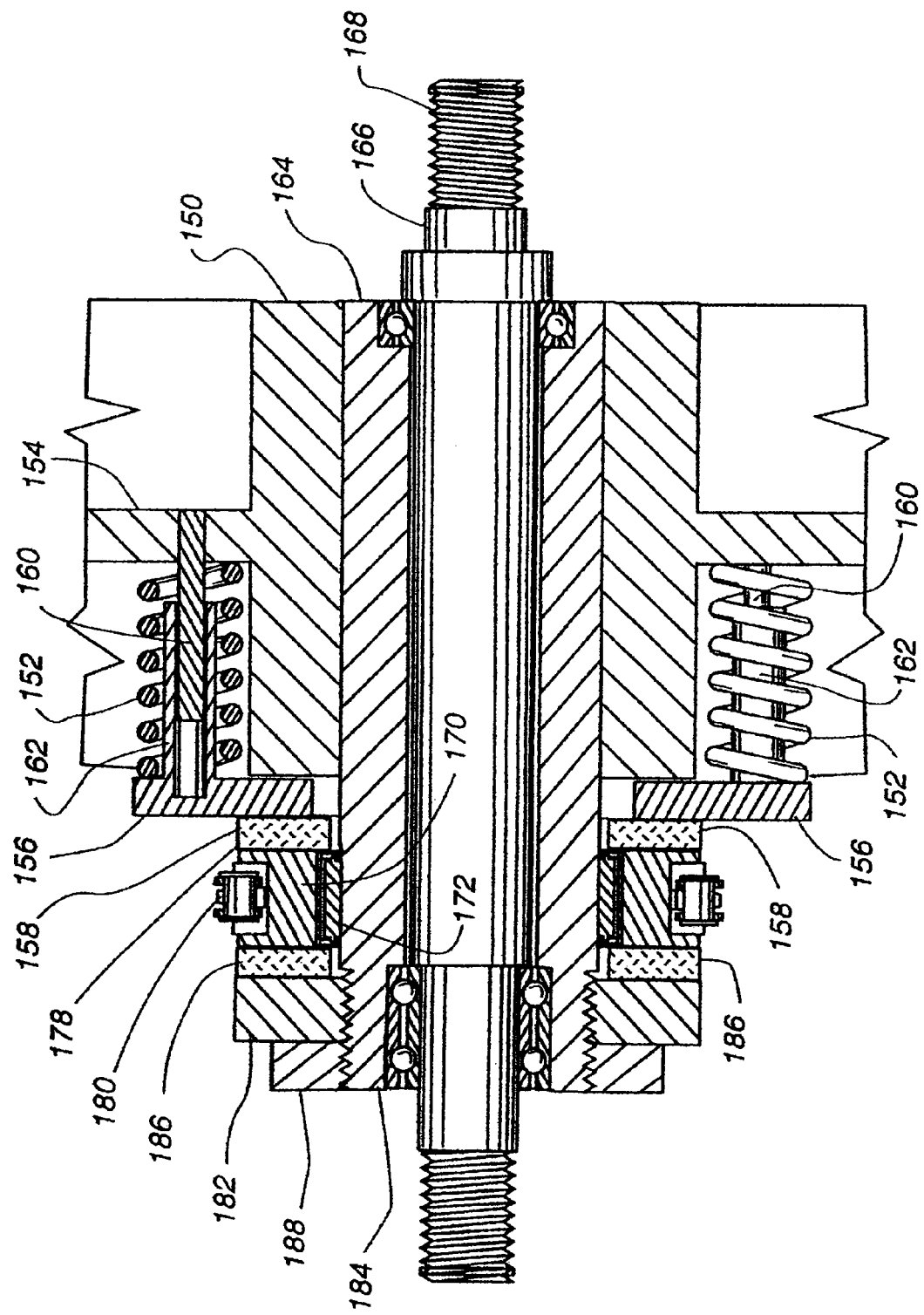
FIG. 19 is a section taken along line 19—19 of FIG. 18.

Referring to FIGS. 5A and 5B, the inner flange 122 is able to move axially (longitudinally) along the all or a portion of the length of the cylindrical main body 118 of the clutch plate collar 69. Referring to FIGS. 7, 8 and 9, the inner flange 122 has a central bore 124, defining a plurality of radially inwardly extending keys 126. Corresponding longitudinally extending slots 128 are formed on the surface of the cylindrical main body of the clutch plate collar 69 at its inner end, and extend at least partially along the length of the main body, to receive the keys 126 and allow the inner flange 122 to move (float) axially along the length of the cylindrical main body, to the extent of the length of the slots. The benefit of the axial movement of the inner flange of the clutch plate collar 69 is described in more detail below. When the cylindrical main body 118 is threadedly connected to the axle housing 64, the inner flange is positioned so the keys are slidably received in the slots, and the inner flange is retained on the end of the cylindrical main body by the hub 62 or the axle housing (by end of axle housing as shown in FIG. 5A). The intersection of the keys 126 in the slots 128 make the inner flange turn with the cylindrical main body 118.

A one-way bearing 66, such as an INA shell-type roller clutch as found in the INA Bearing Company, Inc. of Fort Mill, S.C., catalog #305, 1988 at page 164, is mounted on the cylindrical main body 118 of the clutch plate collar 69 between the end of the slots 128 and the outer flange 120. The rollers of the bearing 66 engage the outer surface of the cylindrical main body member 118, and can slide (float) along the length of the main body, as described in more detail below. The one-way bearing permits direct-drive in one direction, and free-wheeling in the other rotational direction, also described in more detail below.

Referring to FIGS. 5A, 7, and 10–13, a sprocket collar 58 defines a central bore and is positioned concentrically over the cylindrical main body member 118 of the clutch plate collar 69, and is attached to the outer race of the one-way bearing. The sprocket collar 58 defines an outer radially extending engagement collar 130 spaced away but substantially coextensive with the outer flange 120 of the clutch plate collar 69, an inner radially extending engagement collar 132 spaced away from but substantially coextensive with the inner flange 122 of the clutch plate collar 69, and the slave sprocket 54 formed about the outer surface of the sprocket collar 58 and between the inner and outer extending collars 130 and 132. The chain 56 engages the slave sprocket 54. The engagement collars 130 and 132 are extensions of the sidewalls of the sprocket collar, and provide more surface area if needed for the clutch-function they perform, as defined below.

The following explains the relative movement and drive characteristics of the clutch plate collar 69, sprocket collar 58, and flywheel 44 with the structure described at this point. When the slave sprocket 54 is driven in the forward direction (clockwise with respect to FIG. 3, counter-clockwise with respect to FIGS. 1 and 2) by the chain 56, the one-way bearing 66 engages and causes the slave sprocket 54 to rotate the sprocket collar 58, in turn rotating the clutch plate collar 69, which in turn rotates the axle housing 64, which causes the flywheel to turn. If the slave sprocket 54 is caused to move in the opposite direction (counter-clockwise in FIG. 3, clockwise in FIGS. 1 and 2), the one-way bearing would allow the sprocket collar 58 to free-wheel on the clutch plate collar 69.

Ideally a friction clutch or braking material 70 in the form of a flat washer (a disk with a central aperture formed therein) is positioned between the outer flange 120 of the clutch plate collar 69 and the outer collar 130 of the sprocket collar 58, and between the inner flange 122 of the clutch plate collar 69 and the inner collar 132 of the sprocket collar, as best shown in FIGS. 5A, 5B, and 7. The friction clutch material 70 can be attached to either the outer flange 120 or the outer collar 130, and the friction clutch material 70 can be attached to either the inner flange 122 or the inner collar 132, to anchor the clutch material. The clutch material 70 can be felt, cork, standard brake material, or any material that provides a sufficient frictional relationship between the coextensive flanges and collars. Preferably, clutch facing, as shown in McMaster-Carr Company catalog number 101, 1995, at page 2530, is used at a thickness of approximately 2.0 mm. Insert description for collar for inside diameter for free-floating and not connected to either side. In some instances, such as when the clutch material is not attached to either the clutch plate collar or the sprocket collar, but instead just floats between the two, a bearing washer is attached to the perimeter of the central aperture to help support the clutch material on the axle housing.

Compression means, such as a compression spring 72, is positioned around the hub 62 of the flywheel 44 to engage the inner flange 122 of the clutch plate collar 69 to bias the inner flange toward the outer flange 120 of the clutch plate collar. The spring 72, such as a jumbo compression spring in the McMaster-Carr catalog number 101, biases the inner flange 122 outwardly to clamp the clutch material 70 between it and the inner collar 132, and also clamps the clutch material 70 between the outer collar 130 and the outer flange 120. The designed axial movement of the inner race (such as by sliding) on the cylindrical main bearing 66 (keys 126 sliding in the slots 128) allows the sprocket collar 58 to float and transmit the force of the spring 72 to the outer flange 120. The combination of the bias force created by the spring 72, and the engagement of the clutch plate collar 69 and the sprocket collar 58 with the clutch material 70 in between creates a friction force having an upper limit ("break free") force required to cause the sprocket collar 58 to move independently of the clutch plate collar in the reverse direction.

For instance, where the spring force is approximately 225 pounds when fully compressed, and the clutch material has an inner diameter of 1.65 inches and an outer diameter of 2.52 inches, where two clutch material disks were used (FIG. 5B), the break free force has been tested to be approximately 55 pounds at the pedal. It has been found that as the spring extends due to wear of the clutch material, the spring force reduces to approximately 200 pounds, and the break free force actually increases. This is believed to be due to the fact that the engaging surfaces clamping the clutch material become polished and increase the surface area, thus increasing the static friction force to be overcome.

The following explains the relative movement of the clutch plate collar 69, sprocket collar 58 and flywheel 44 given the structure described to this point. When the slave sprocket 54 is driven in the forward direction, as defined above, the one-way bearing creates the direct-drive relationship with the flywheel 44 desired for this type of exercise bicycle. When the slave sprocket 54 is driven in the backward direction, or there is a reverse force applied to the slave sprocket to attempt to rotate it in a direction opposite the direction of rotation of the flywheel, the one-way bearing does not drive the flywheel 44, but instead allows the pedals to free wheel. However, the friction force generated between the clutch plate collar 69 and the sprocket collar 58 due to the engagement of the outer flange 120 and the outer collar 130 with the inter-positioned clutch material 70, and the inner flange 122 and inner collar 132 with the inter-positioned clutch material 70, acts to create a threshold friction force that must be overcome to allow the rider to drive the sprocket collar 58 independent of the flywheel 44. If the force applied by the rider to the pedals is large enough to overcome the friction ("break free") force, then the pedals cause the sprocket collar 58 to turn independently of the clutch plate collar 69, with the clutch material 70 being rubbed and worn down in the process.

As the clutch material 70 wears down and becomes thinner, the spring 72 extends to push the inner flange 122 (floating) along the slots to maintain the appropriate force on the clutch material 70. The sprocket collar 58 is also pushed outwardly to maintain the desired force, and resulting "break free" characteristics. The spring 72 thus allows for automatic adjustment to compensate for the wear of the clutch material 70. The spring 72 must be selected to have a relatively predictable and stable spring constant along its length of extension to insure the development of the proper friction forces. The spring can be replaced with an elastomeric tube 73 having sufficient spring properties in the axial direction, such as is shown in FIG. 5C. Some elastomeric materials have very stable spring constants. One such suitable elastomeric material is a polyurethane made by Kryptonics Inc. of Louisville, Colo. Preferably, the tube 73 is approximately 1 inch long, 0.887 inches when initially compressed, and has a wall thickness of approximately 0.225 inches. In addition, an adjustable compression spring could also be used that would allow the spring force to be adjusted to modify the break free force when desired.

The inner or outer clutch material 70 can be replaced by a bearing if it is desired to use only one clutch material 70. The break-free force threshold may be modified accordingly as a result.

Similar relative movement is found when the exercise bicycle incorporating the present invention is in use, and more clearly depicts the advantages of the free wheel clutch mechanism of the present invention. When a rider is exercising on the exercise bicycle, the forward drive of the drive train causes the slave sprocket 54 to drive the sprocket collar 58 in the direction of engagement of the one-way bearing, in the end to drive the flywheel 44 in a direct drive manner. If the rider desires, by applying a force of approximately 50 pounds in the opposite direction, the threshold friction force between the clutch plate collar 69, the sprocket collar 58 and the clutch material 70 is overcome (the "break free" force), and the sprocket collar 58 can free wheel with respect to the clutch plate collar 69 and the flywheel 44. The sprocket collar 58 thus moves in the opposite direction with respect to the direction of rotation of the flywheel 44. The rider can thus pedal irrespective of the movement of the flywheel 44 until the friction between the clutch plate collar and the sprocket collar (caused by the clutch material) reduces the rpms of the flywheel to a point where, based on the gear ratio, the rpms match to cause "lock-up".

In a more extreme situation, if the foot of the rider slips off the pedal and the pedal strikes the rider's leg, a sufficient force is generated to overcome the "break free" force and the pedals can stop to reduce the chance of serious injury, letting the flywheel continue to rotate until the friction force stops the rotation of the flywheel.

An axle 134 (FIGS. 5A and 5B) is positioned through the bore in the hub, with associated bearings to support the flywheel 44 and allow it to rotate as driven by the gear train.

The one-way bearing is not necessary for the application to work on an exercise bicycle. However, without the one-way bearing the sprocket collar would "free wheel" in the forward direction too when the drive force was greater than the "break free" force, thus limiting the amount of force the rider could apply while pedaling the bicycle in the forward direction.

The one-way bearing 66 can be replaced by a spring-loaded ratchet and pawl drive mechanism found in normal bicycle applications, or other one way drive mechanisms that can functionally replace the one-way bearing described above. One such suitable commonly available ratchet and pawl mechanism is the LMA-8 from the LIDA Machinery Company, Ltd. of Taoyuan, Taiwan, as shown in the Taiwan Bicycle Source 1997–98 catalog at p. 370.

FIGS. 8 through 16 show details of some of the components described above.

An alternative embodiment of the free wheel clutch mechanism is shown in FIGS. 17–20. This alternative embodiment works on the same principle as the first embodiment described above, except basically replaces the single large spring surrounding the hub 150 with the plurality of smaller springs 152 positioned between the flywheel 154 and the inner clutch plate 156. These plurality of springs 152 act to push the inner clutch plate 156 outwardly as the clutch material 158 wears down from use. As can best be seen in FIGS. 19 and 20, each of the plurality of springs surrounds a guide rod 160 mounted to the flywheel 154 which is received in a guide bore 162 mounted to and extending from the inside side of the inner clutch plate 156. The sliding interaction between the guide rod 160 and the guide bore 162 helps ensure that the inner clutch plate 156 is squarely moved outwardly under the bias of the springs as the clutch material wears as a result of use. The interaction of the guide rod with the guide bore also causes the inner clutch plate 156 to turn with the flywheel 154 because the guide rods are laterally fixed in position inside the guide bores, and as the guide rods turn with the movement of the flywheel, they cause the inner clutch plate to turn also.

The axle housing 164 is press-fit into the hub 150 and extends from the flywheel 154, and has an outer end 166 with external threads. After the inner clutch plate 156 and associated compression springs 152 are mounted over the axle housing and positioned adjacent the hub, the slave gear collar 170 is positioned to engage the outer surface of the axle housing 164 as in the previous embodiment, including having the same bearing structure 172. The slave gear collar has an inner surface 174 adjacent the outer surface 176 of the inner clutch plate, between which is positioned an inner clutch material washer 178. The inner clutch material washer 178 is preferably fixed to either the outer surface of the inner clutch plate 156 or the inner surface of the slave gear collar 170. A set of gear teeth 180 are formed about the outer circumference of the slave gear collar 170 for receiving the chain used to drive the flywheel.

The outer clutch plate 182 (or anchor plate) is then threaded on to the externally threaded outer end 184 of the axle housing. An outer clutch material washer 186 is positioned between the outer surface of the slave gear collar 170 and the inner surface of the outer clutch plate 182. Preferably, the outer clutch material washer 186 is fixed to either the outer surface of the slave gear collar 170 or the inner surface of the outer clutch plate 182. The outer clutch plate is fixed to the axle housing by a lock-nut 188 to keep the outer clutch plate from turning loose under the force of the free wheel mechanism.

This alternative embodiment of the present invention operates in fundamentally the same manner as the previously described embodiment. When a reverse force is applied to the drive train, normally through a reverse force being applied to the pedals, and this reverse force overcomes the "break free" force, the slave gear overcomes the friction force between the slave gear collar 170 and the outer clutch plate 182 and inner clutch plate 156 which rotate with the flywheel 154. This allows the flywheel to continue spinning while the drive train is either stopped, pedaled backwards, or pedaled more slowly than the flywheel is spinning. The bearings 172 connecting the slave gear collar 170 to the axle housing 164 are one-way bearings as described above, and when the drive train is actuated in the normal or forward direction, the bearings lock and act as a direct drive connection between the drive train and the flywheel.

When turned in the reverse direction, the bearings 172 allow the slave gear collar 170 to free-wheel, the free wheeling of which is restricted by the frictional engagement of the slave gear collar 170 with the surrounding clutch material 178, 186. The compression springs 152 apply the force to the inner clutch plate 156 which presses the inner clutch material 178 against the slave gear collar. The slave gear collar 170 can move longitudinally on the axle housing 164 (the bearing allows small amounts of movement in this direction) and thus transmits a force to the outer clutch material 186, and finally to the outer clutch plate 182. As the inner or outer clutch material wears down, the springs 152 extend and push the inner clutch plate 156 outwardly and thus maintain the contact necessary for the frictional engagement between the inner clutch plate 156, the inner clutch material 178, the slave gear collar 170, the outer clutch material 186, and the outer clutch/anchor plate 182.

Figure 20:
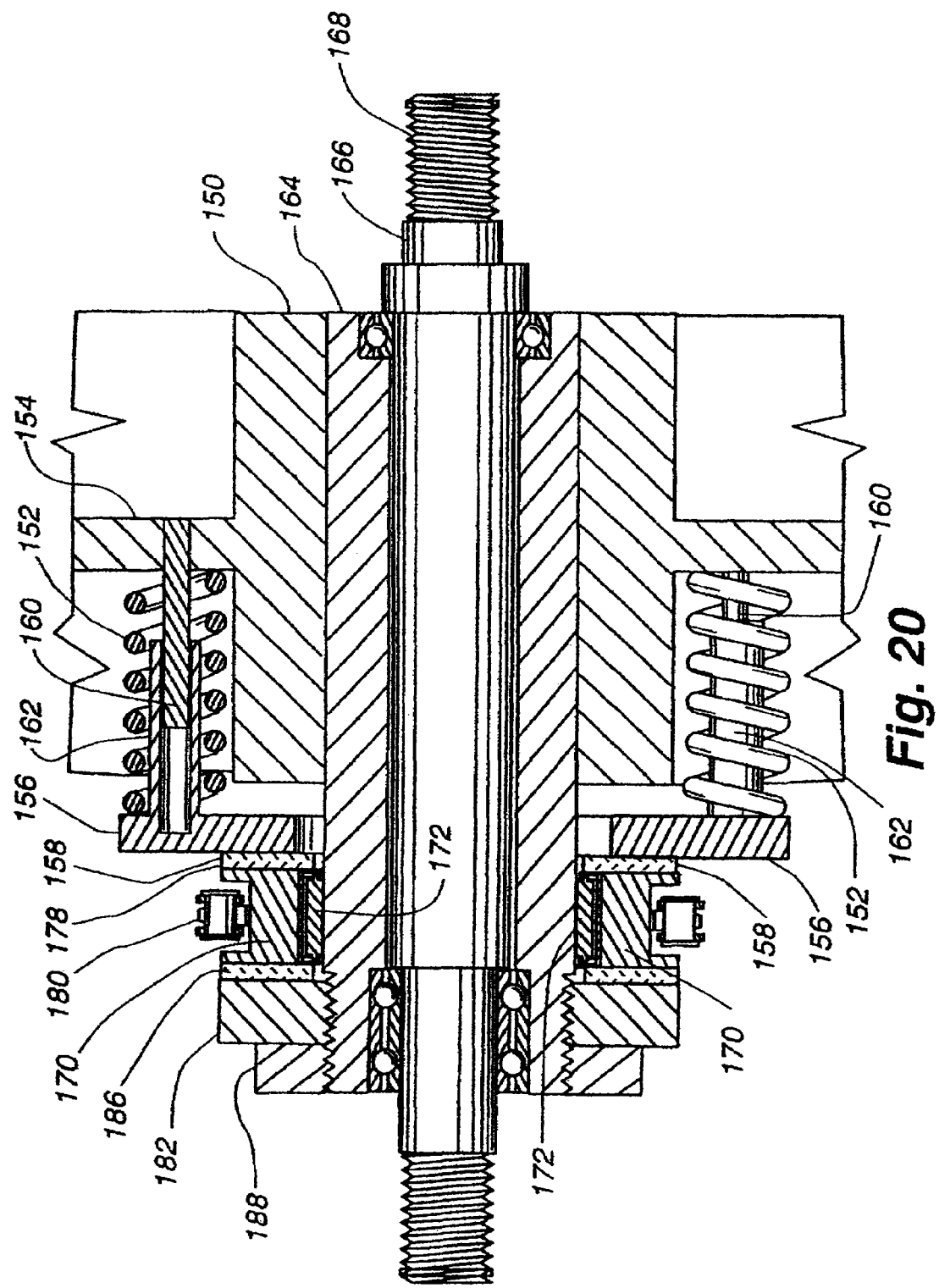
FIG. 20 is a representative section of the embodiment shown in FIG. 19, showing the effect of worn clutch material.

FIG. 20 shows the adjusted relationship of the structure of this alternative embodiment when the inner and outer clutch material washers 178, 186 have worn down. Contrasting FIGS. 19 and 20, note the gap between the inner clutch plate 156 and the outer end of the hub 150. The bearings 172 allow the slave gear collar 170 to move longitudinally on the axle housing 164. Either one of the inner or outer clutch materials 178, 186 can be replaced with a bearing if it is determined that they are unnecessary.

Figure 21:
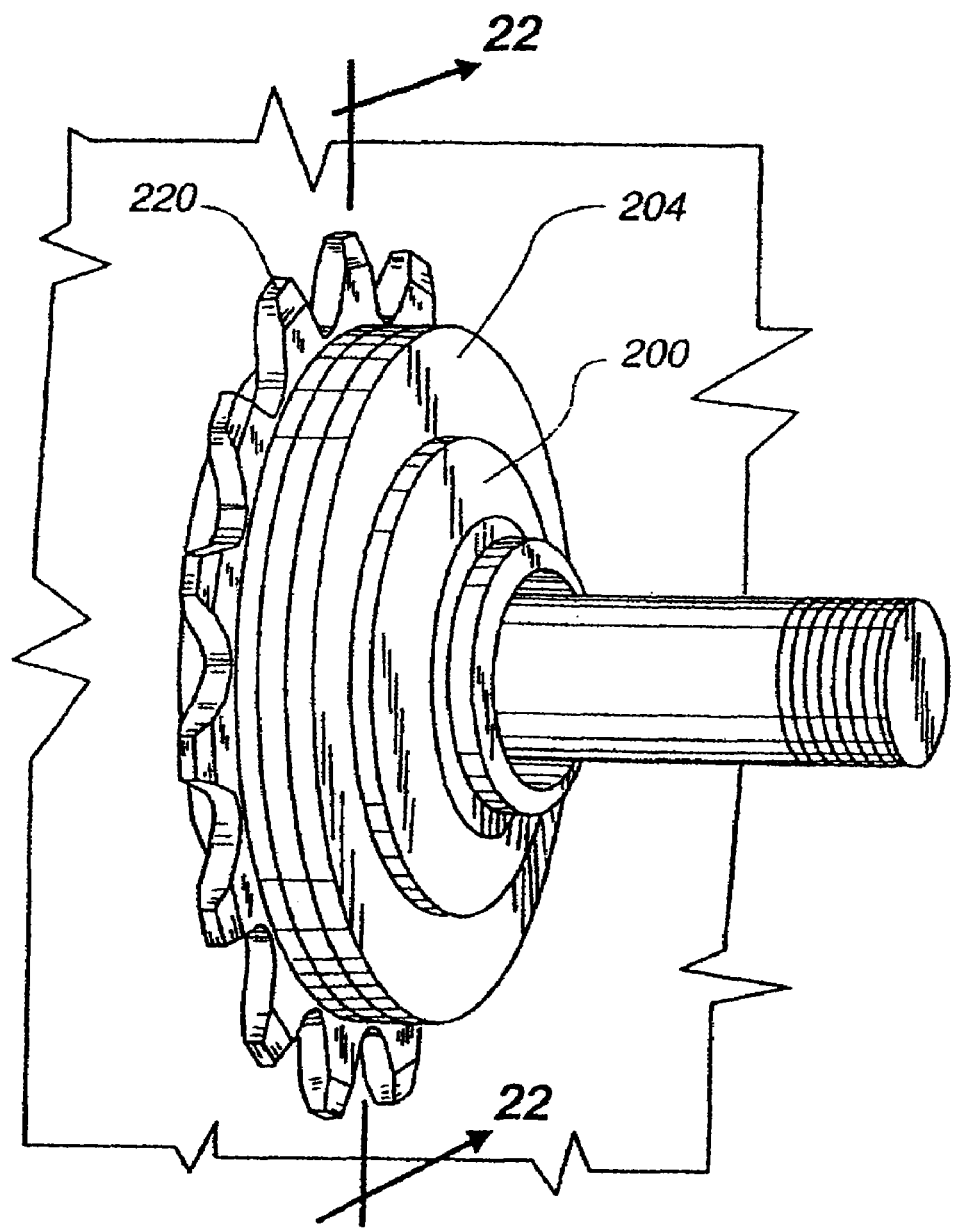
FIG. 21 is an enlarged perspective view of another embodiment of the present invention.
Figure 22:
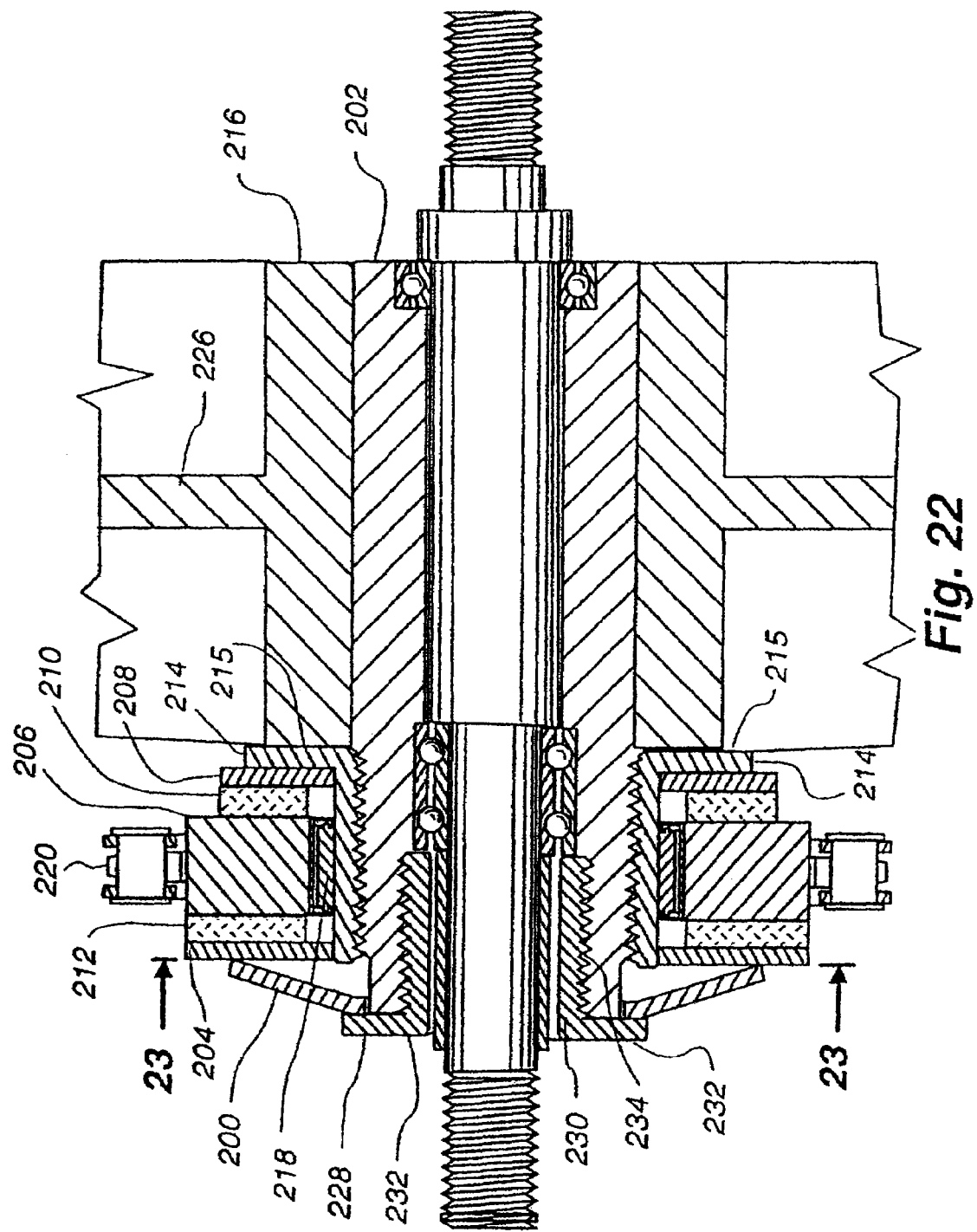
FIG. 22 is a section taken along line 22—22 of FIG. 21.
Figure 23:
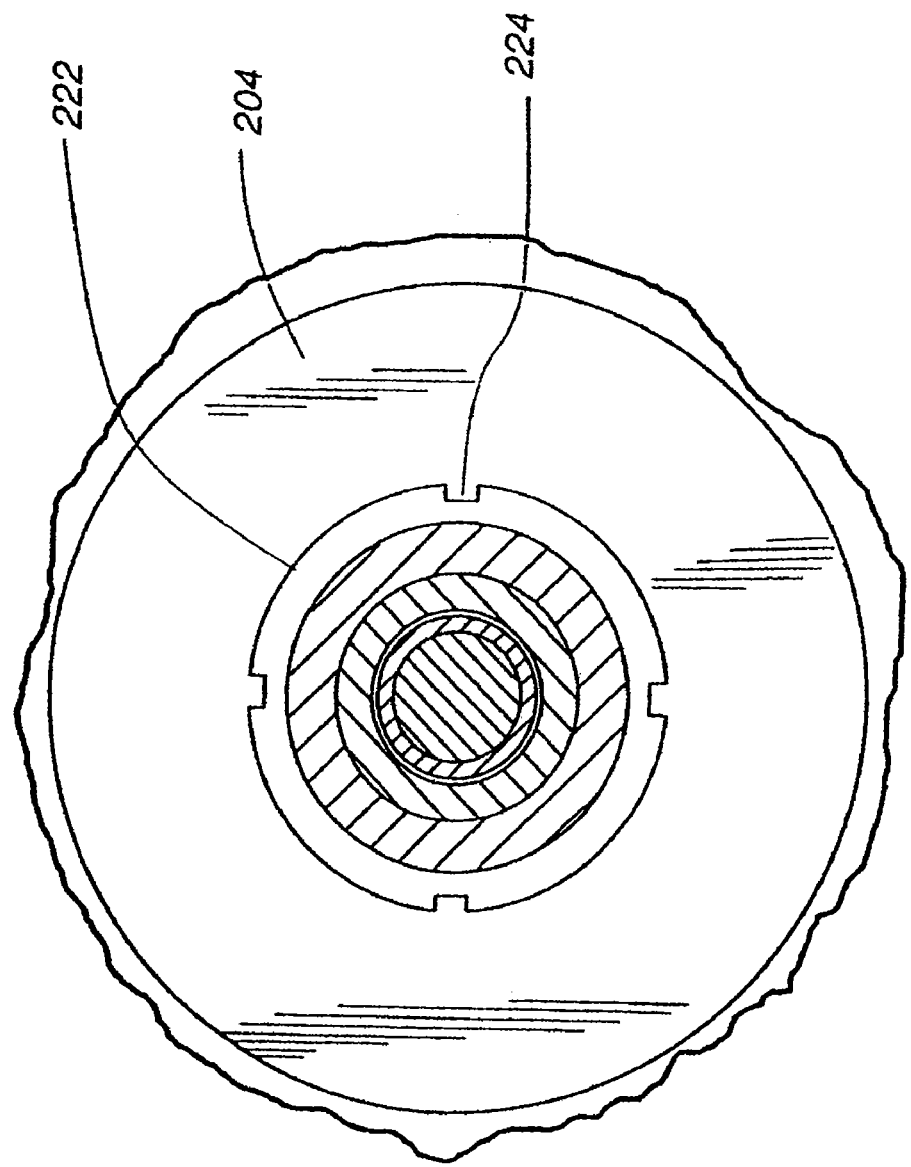
FIG. 23 is a section taken along line 23—23 of FIG. 22.

Another alternative embodiment is shown in FIGS. 21–23. In this alternative embodiment a Belleville washer 200 is mounted on the end of the axle housing 202 to bias the outer clutch plate 204 inwardly to create the desired friction force between the slave gear collar 206 and the outer and inner clutch plates 204, 208 through the inner and outer clutch material washers 210, 212. In the second alternative embodiment a retainer 214 having an outwardly flanged inner end 215 is threaded on to the end of the axle housing 202 extending from the hub 216, which has external threads. The outwardly extending flange 215 of the retainer butts up against the hub 216. The inner clutch plate 208 is then positioned next to the outwardly extending flange 215 and is retained in rotational position therewith by keys in slots or by any other suitable attachment method, such as welding (as shown in FIG. 22). Alternatively, the outwardly extending flange can act as the inner clutch plate.

An inner clutch material washer 210 is positioned adjacent to and in contact with the inner clutch plate 208, and the slave gear collar 206 is mounted over the cylindrical body of the retainer 214. The slave gear collar 206 is similar to the slave gear collars described in the previous two embodiments and includes a bearing 218 positioned between the slave gear collar 206 and the outer circumference of the retainer 214, the bearing 218 being a one-way bearing allowing the slave gear collar 206 to free-wheel when turned in a reverse direction, and locking to provide a direct drive when turned in the forward direction. Gear teeth 220 are formed on the outer circumference of the slave gear collar 206 for engagement with the chain of the drive train. An outer clutch plate 204 is positioned over the outer circumference of the retainer 214. As shown in FIG. 23, the outer clutch plate 204 defines a central bore 222 having at least one key 224 formed for mating insertion into a corresponding slot formed in the retainer 214. The mating key and slot relationship between the outer clutch plate 204 and the retainer 214 makes the outer clutch plate turn with the flywheel because the retainer turns with the flywheel 226 and the rotational interference between the key and the slot causes the outer clutch plate 204 to turn also, in addition to allowing the outer clutch plate to float or move inwardly and outwardly with respect to the inner clutch plate 208 along the body of the retainer as the friction clutch material 210, 212 wears down.

The Belleville washer 200 is positioned about the end of the axle housing to engage the outer clutch plate 204 with the bias force. The bias force is created by an outer retainer 228 which defines a cylindrical main body 230 having external threads and an outwardly extending flange 232 at one end. The outer end of the axle housing 202 defines internal threading 234 such that the cylindrical main body 230 of the outer retainer 228 threads into the outer end of the axle housing 202 to the point where the outwardly extending flange 232 abuts the outer end of the axle housing and also engages the inner rim of the Belleville washer 200 to compress the Belleville washer against the outer clutch plate 204. The compression of the Belleville washer 200 against the outer clutch plate 204 causes the outer clutch plate to be biased inwardly against the outer friction clutch material 212, which is pushed against the slave gear collar 206, which in turn is allowed to relatively float on the outer surface of the inner retainer 214 to push against the inner clutch material 210 and in turn frictionally engage the inner clutch plate 208.

As the slave gear collar 206 is driven in the forward direction by the drive train, the one-way bearings 218 lock and create a direct drive relationship. When a sufficient reverse force is applied to the slave gear collar through the drive train, the one-way bearings release and allow the drive train collar to free-wheel under the influence of the frictional relationship with the inner and outer clutch plates, similar to the interaction as described with respect to the embodiments above.

As the clutch material 210, 212 wears down and becomes thinner, the Belleville washer 200 extends to continue to create a friction force in the clutch system by pushing the outer clutch plate 204 towards the inner clutch plate 208, thereby clamping the inner and outer clutch material and the slave gear collar 206 therebetween.

Figure 24:
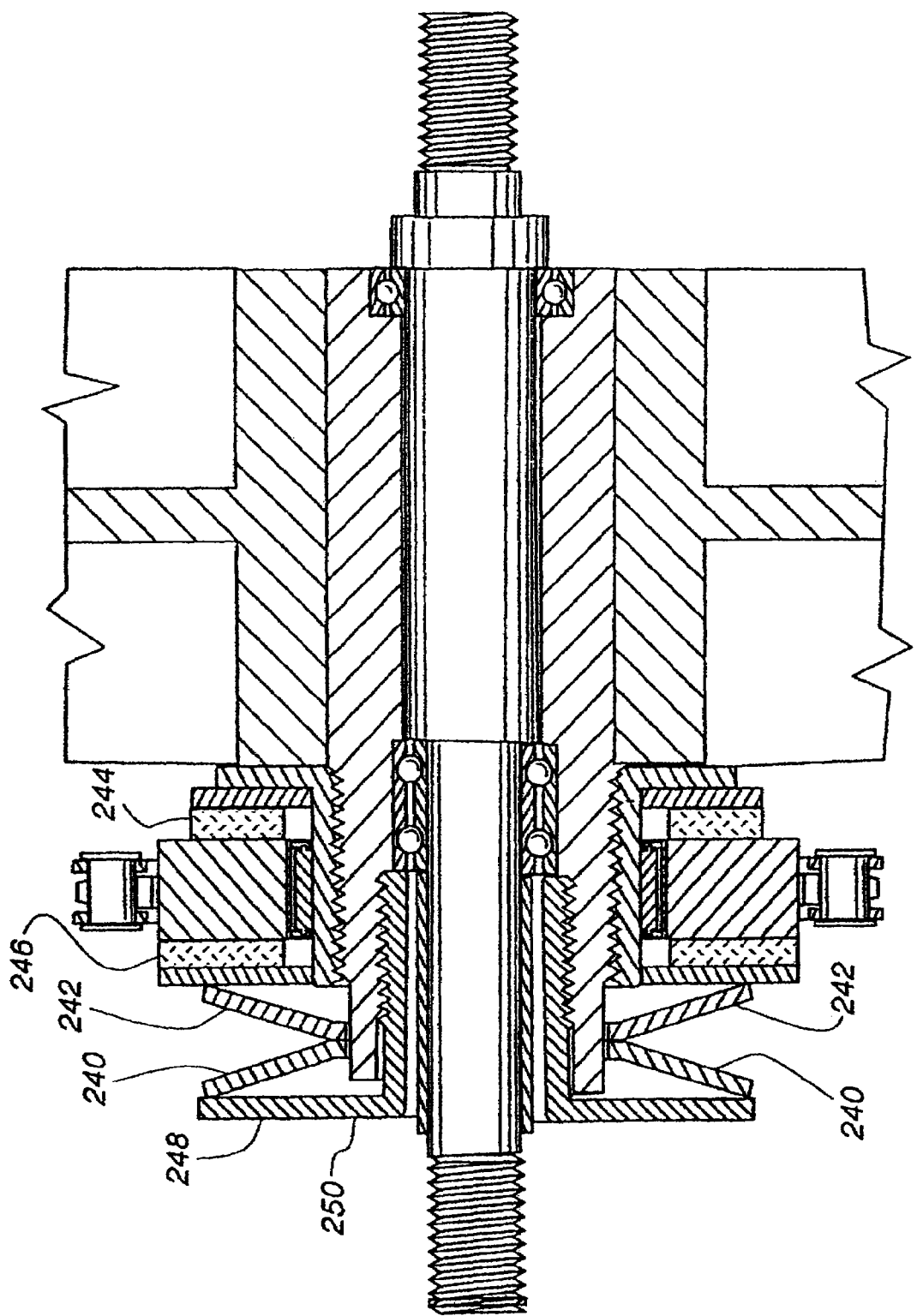
FIG. 24 is a representative section of an alternative embodiment similar to that shown in FIGS. 22, 23 and 24.

Another alternative embodiment is disclosed in FIG. 24 which shows two Belleville washers 240, 242 positioned back to back to allow for a longer adjustment stroke due to the wear of the inner and outer clutch material washers 244, 246. In this third embodiment the outwardly extending flange 248 of the second retainer 250 is enlarged to engage the outer rim of the second Belleville washer 240. Belleville washers are very stiff and provide a great deal of force through the length of their extension.

Figure 25:
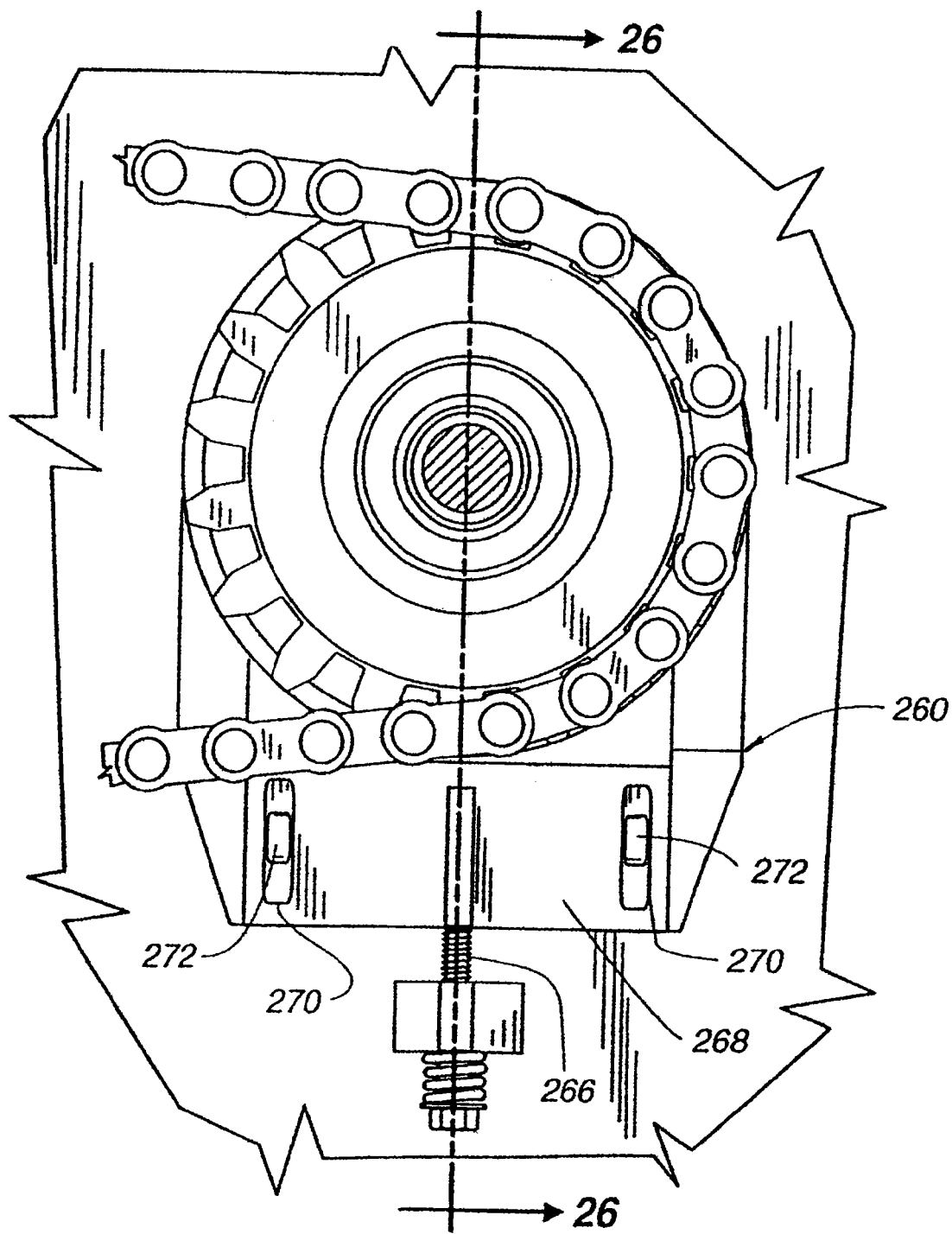
FIG. 25 is an elevation view of another embodiment of the present invention.
Figure 26:
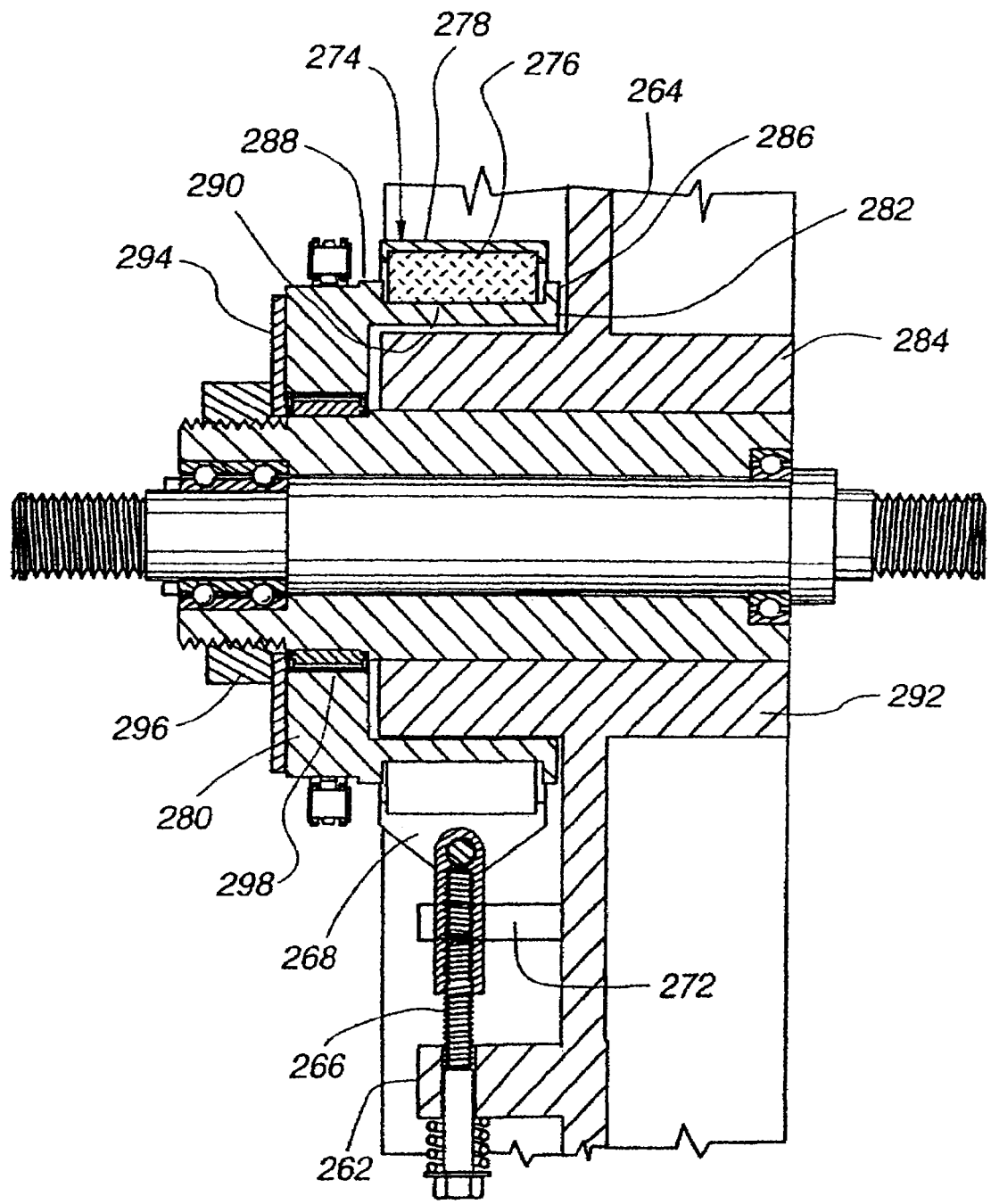
FIG. 26 is a section taken along line 26—26 of FIG. 25.

Another alternative embodiment is disclosed in FIGS. 25–26. This fourth alternative embodiment utilizes a band-brake to create the frictional break-free force. The band-brake 260 includes a retainer 262 fixed to the flywheel 264 through which is positioned a spring loaded adjustment screw 266 which attaches to a housing 268. The housing includes two guide slots 270 for slidably receiving tabs 272 formed on the flywheel. The housing is also fixed to the opposite ends of a belt 274. The slidable engagement of the guide slots 270 on the tabs 272 help ensure a properly oriented adjustment of the band-brake by the spring loaded screw. The slots are formed in the housing of the band-brake, the housing being attached to a belt, with the band-brake material 276 attached to the inside surface a reinforcement sheathing 278 of the belt (as best seen in FIG. 26). The tabs, spring loaded threaded screw, housing and belt are all fixed to rotate with the flywheel. The spring surrounding screw 266 makes the system self-adjusting for wear of the band material by applying a preferably constant tension load on the belt through the housing. The selection of the spring constant properties of the spring determines the amount of tension on the belt, and the amount of adjustment (displacement) the band-brake can accommodate.

As best shown in FIG. 26, the slave gear collar 280 defines an annular axial extension 282 which fits over a portion of the hub 284 without contacting the hub. This annular extension 282 defines an inner rim 286 and an outer rim 288, between which is an engagement surface 290. The band contacts the engagement surface 290 between the inner rim and the outer rim. The slave gear collar 280 includes the same bearing system as previously described for one-way engagement with the outer surface of the axle housing 292. The proper positioning of the slave gear collar 280 is maintained on the axle housing by a large washer 294 which is tightly pressed against the outer surface of the slave gear collar by a nut 296 to keep the slave gear collar from becoming imbalanced. A second set of one-way bearings could be positioned between the annular extension 282 from the slave gear collar and the outer surface of the hub over which the slave gear collar annular extension is positioned.

As the drive train is actuated in the forward direction by the rider, the one-way bearing 298 between the slave gear collar 280 and the axle housing 292 engages to cause a direct drive relationship between the drive train and the flywheel, as in the previously described embodiments. In the event a sufficient reverse force is applied to the slave gear collar through the drive train, the one-way bearing 298 releases and allows the slave gear collar to free-wheel subject to the frictional engagement of the slave gear collar and the belt 274. The engagement surface 290 is in frictional engagement with the belt to create the "break free" force. The "break free" force is determined by the tightness of the belt around the engagement surface on the annular extension 282 of the slave gear collar. This "break free" force resists the free wheeling of the slave gear collar on the axle housing 292 and provides the beneficial pedal-through feature of traditional direct drive exercise bicycles. It also allows the drive train to free-wheel when a sufficient reverse force is applied to the drive train, likely through the pedals and cranks, to allow the drive train to be driven at a relatively lower RPM than the flywheel, depending on the gear ratio.

As the frictional brake material 276 wears down, the housing 268 is adjusted by tightening the screw 266 to move the housing, and thus tighten the belt 274 around the annular extension 282 of the slave gear collar 280 to maintain the desired frictional engagement, resulting in the desired "break free" force.

Figure 27:
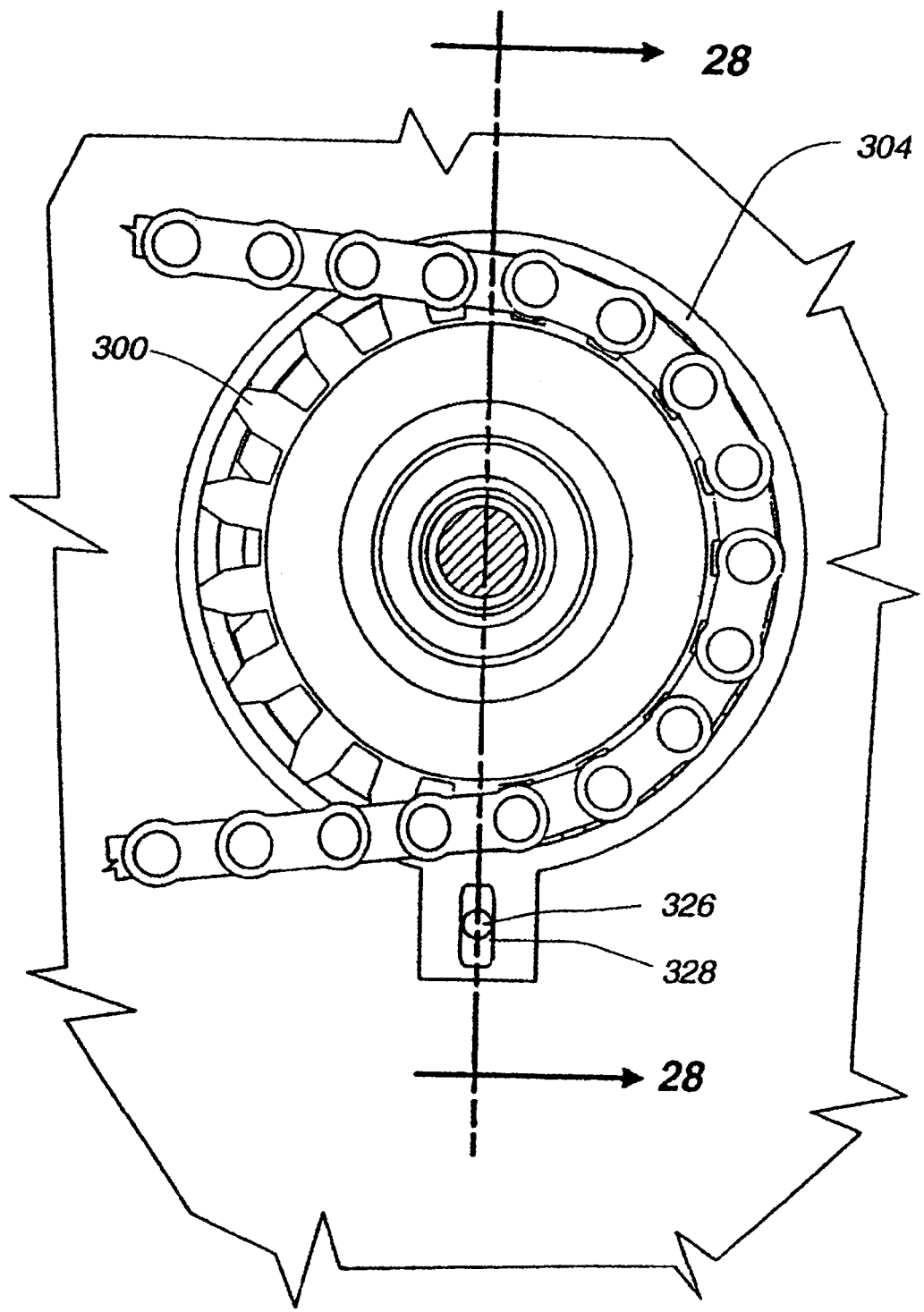
FIG. 27 is an elevation view of another embodiment of the present invention.
Figure 28:
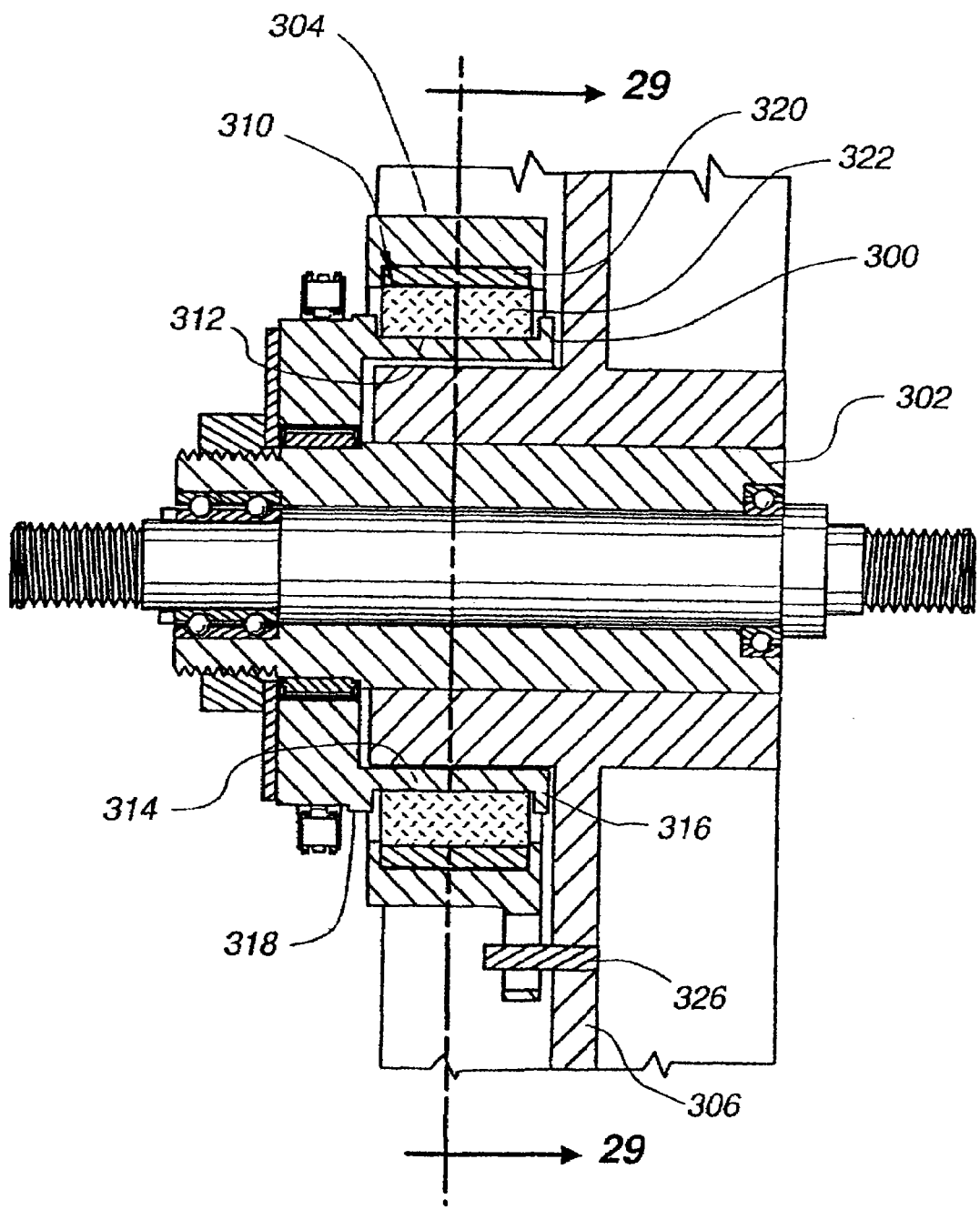
FIG. 28 is a section taken along line 28—28 of FIG. 27.
Figure 29:
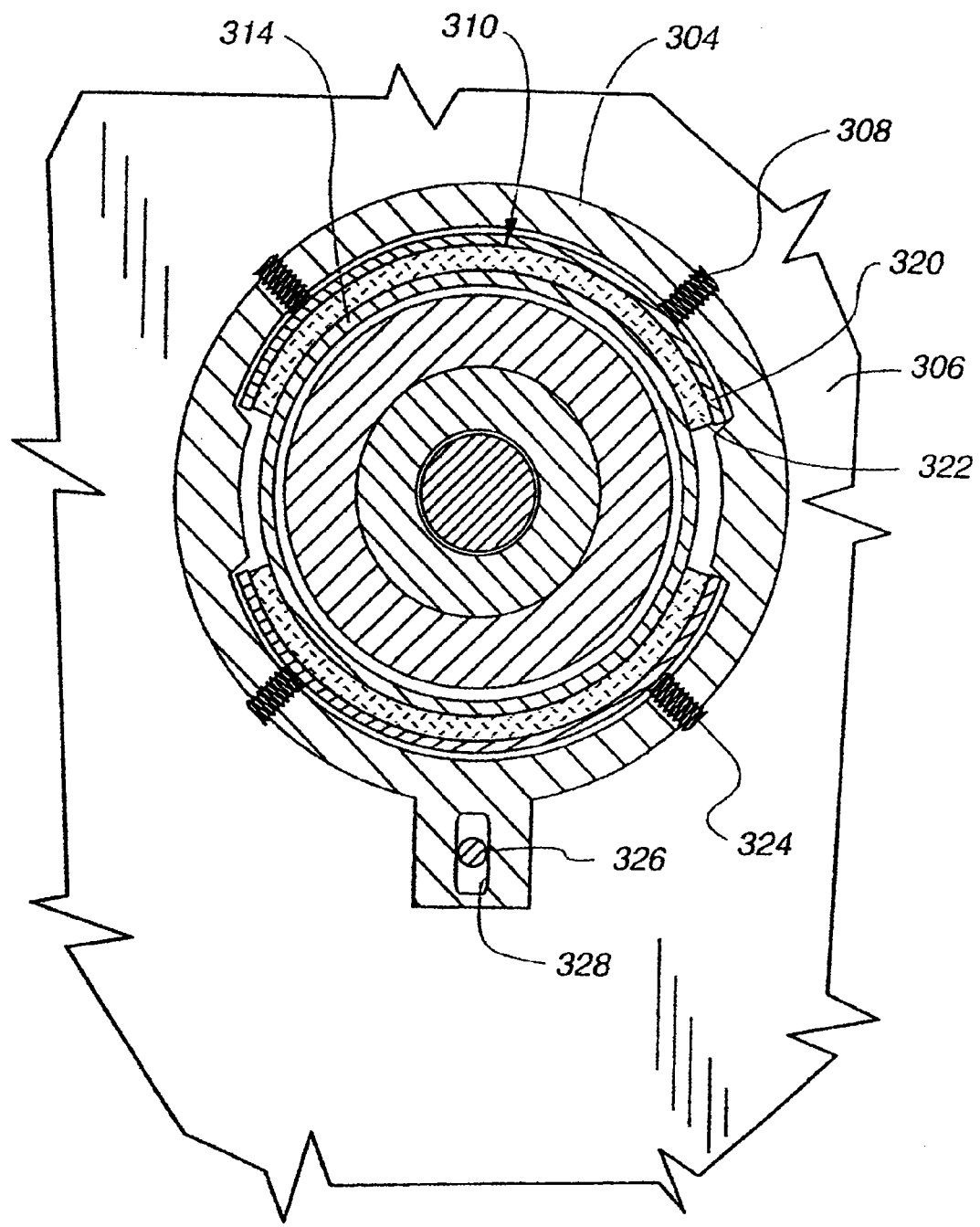
FIG. 29 is a section taken along line 29—29 of FIG. 28.

Another alternative embodiment is shown in FIGS. 27–29. In this embodiment, the slave gear collar 300 has the same structure as the previous embodiment described, and is held in engagement with the axle housing 302 in the same manner. A compression brake housing 304 is mounted in engagement with the flywheel 306 and includes means 308 for causing engagement of arcuate compression members 310 with the engagement surface 312 on the slave gear (sprocket) collar annular extension 314, between the inner and outer rims 316, 318. The arcuate compression members 310 have a hard backing 320 and a frictional clutch material 32 (2 mated to their inner concave surface for engagement with the slave gear collar annular extension 314. The brake housing 304 includes means 308 for radially adjusting the compression of the compression members against the annular extension 314, such as set screws which are threadedly adjustable through the brake housing to engage the hard back surface 320 of the arcuate compression members 310 to press the frictional material 322 of the compression members against the engagement surface 312 of the annular extension. These means can be self-adjusting to accommodate wear of the friction material, such as by being spring-loaded set-screws. As the frictional clutch material wears down, the set screws 324 can be used to maintain the proper compression of the compression members 310 against the engagement surface 312, which creates the desired "break free" force.

This embodiment operates in the same manner to allow a break free clutch mechanism on the flywheel as the previously described embodiments. The brake housing 304 is held in rotational fixed orientation with the flywheel by a pin 326 positioned through a slot 328 in the brake housing. The movement of the pin in the slot allows for uneven wear of the compression members 310.

Figure 30:
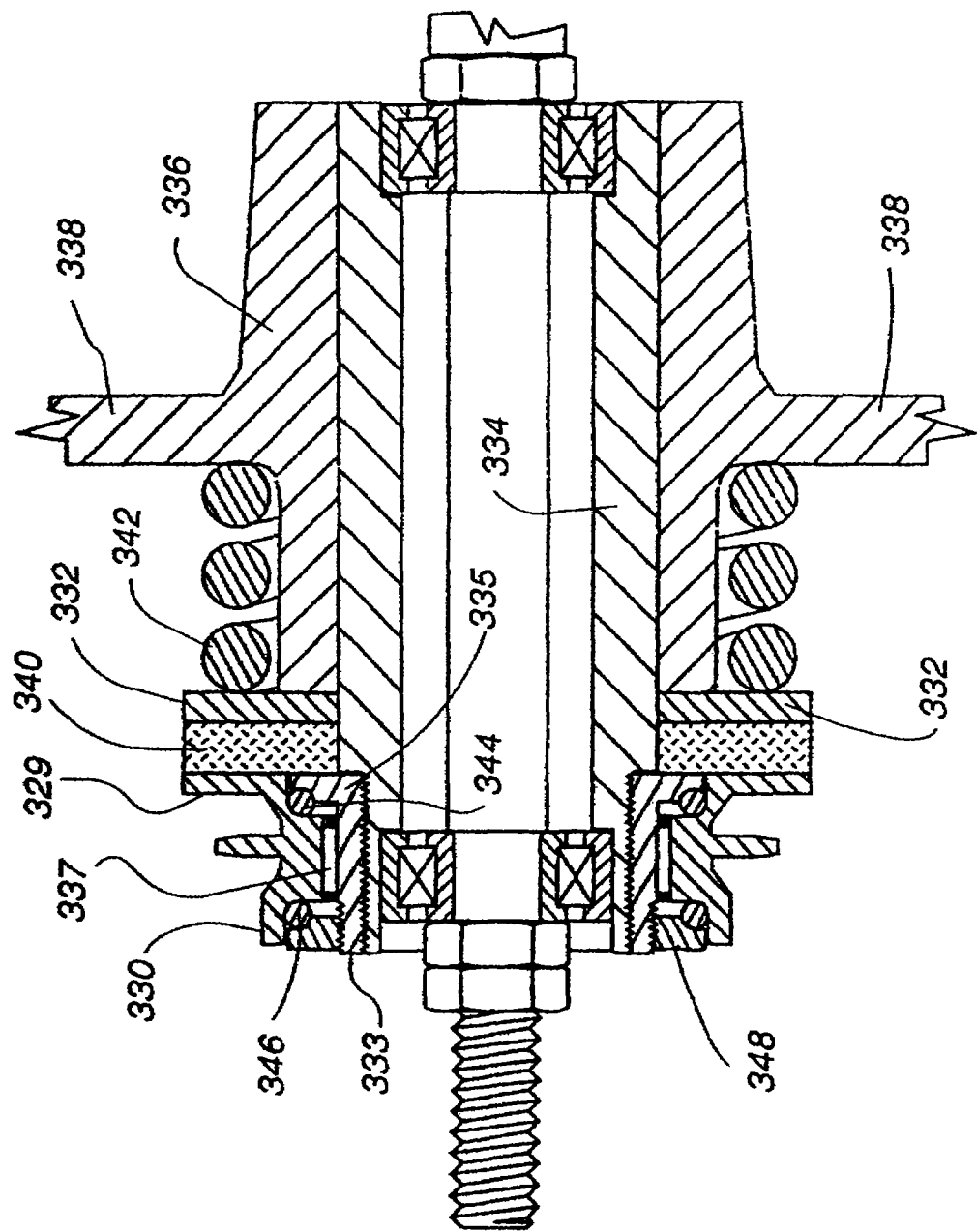
FIG. 30 is a representative section of another embodiment of the present invention.

Another alternative embodiment is shown in FIG. 30. Only one side, the inner side 329 as shown, of the sprocket collar 330 is used to create a frictional engagement with an engagement flange 332 attached to the axle housing 334 at the hub 336 of the flywheel 338. The sprocket collar is positioned on a sheath 333 threadably engaging the axle housing 334 at the hub 336, with a one-way bearing 337 (or ratchet and pawl mechanism) positioned between the sprocket collar and the sheath 333 for the same purpose as disclosed above with many of the other embodiments. Clutch material 340 is positioned between the side 329 of the sprocket collar 330 and the engagement flange 332, and can be attached to either one, to create the frictional engagement therebetween. The engagement flange is moveable along the axle housing of the hub to allow the friction force to be kept at a relatively constant level as the clutch material wears out. This self-adjustment, as described above, occurs when the spring 342, or other means, presses the engagement flange outwardly from the hub to clamp the clutch material against the inner side 329 of the sprocket collar 330. The sprocket collar 330 is supported on the inner and outer sides by an inner 344 and outer 346 bearing, respectively. The inside edge 335 of the sheath forms the outer race for the inner bearing 344, while the sprocket collar forms the inner race for both the inner 344 and outer 346 bearings. The outer race 348, or cone, threadedly engages the outer end of the sheath 333 to hold the sprocket collar 330 in place and provide a thrust bearing against which the spring 342 pushes.

Figure 31:
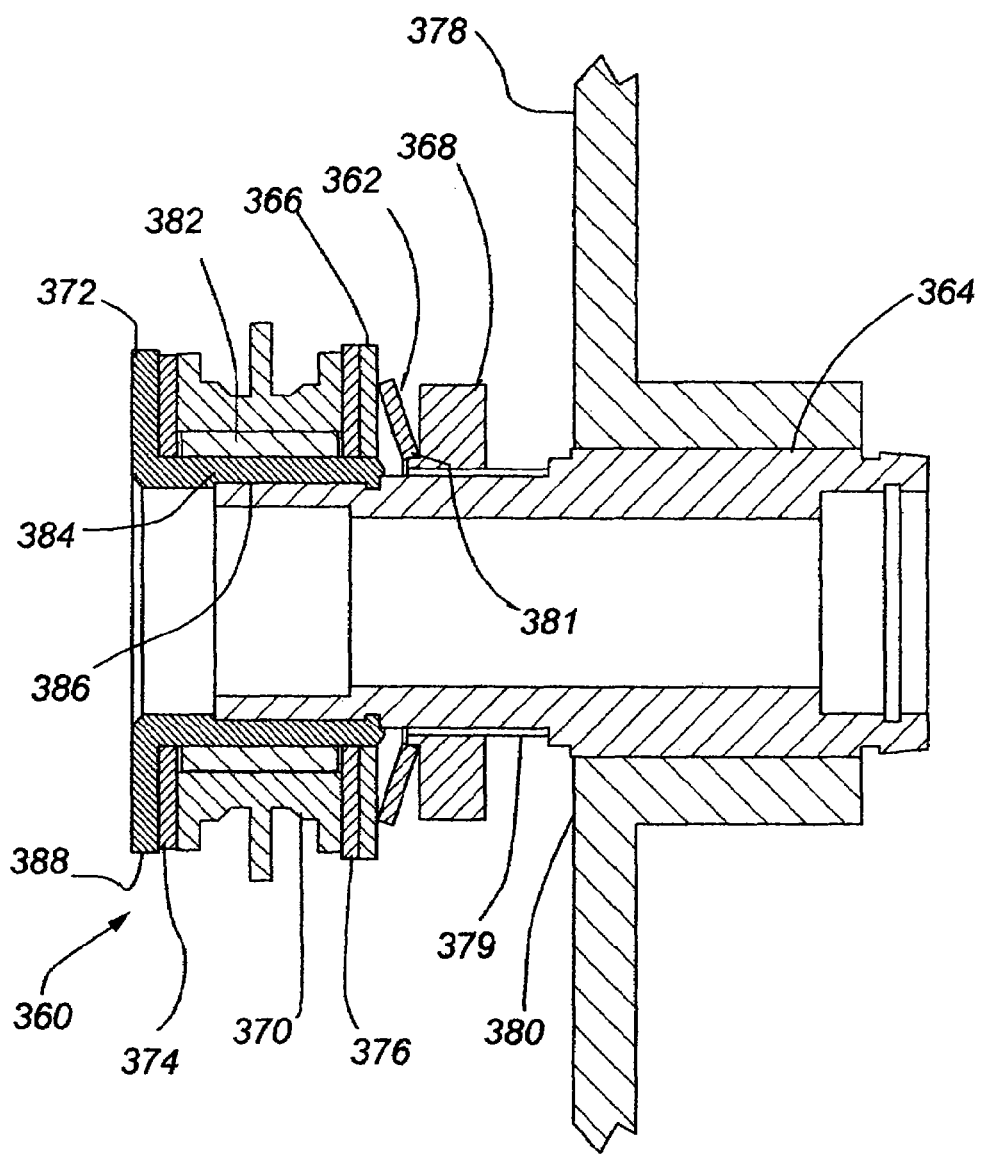
FIG. 31 is a representative section of an alternative embodiment of the present invention.

FIG. 31 illustrates an additional alternative embodiment of a free wheel clutch mechanism 360. This embodiment operates in fundamentally the same way as previously described embodiments. When a reverse force is applied to the drive train, normally through a reverse force being applied to the pedals, and this reverse force overcomes the break-free force, the slave gear overcomes the friction force between the slave gear collar and the inner and outer clutch plates which rotate with the flywheel.

In this alternative embodiment, preferably a Belleville washer 362 is circumferentially mounted on an axle housing 364 between an inner clutch plate collar 366 and a spring tensioner 368 to bias the inner clutch plate 366 outwardly to create the desired friction force between the slave gear collar 370 and the inner and outer clutch plates (366, 372) through the inner and outer clutch plate material washers (374, 376). Alternatively, a biasing member such as a coil spring may be used in place of the Belleville washer 362.

The spring tensioner 368 is coupled to the axle housing 364, and positioned between the flywheel 378 and the inner clutch plate collar 366. In this embodiment, the outside circumference 379 of the axle housing 364 extending between the outside edge 380 of the flywheel 378 and the inner clutch plate 366 is threaded. The spring tensioner 368 defines an internally threaded cylinder that threadedly engages the outside circumference 379 of the axle housing 364. Preferably, the spring tensioner 368 defines an outwardly extending flange 381 circumferential to the axle housing 364 that is adapted to center the Belleville washer 362 about the axle housing 364.

To provide space for the spring tensioner 368, a portion of the flywheel hub 364 adjacent the free wheel clutch mechanism 360 is preferably removed. As shown in FIG. 22, preferably the portion of the hub 216 that extends outwardly from the main body of the flywheel 226 along the axle housing 202 to the inner retainer 214 (366) is removed. Alternatively, a longer axle housing than illustrated in FIG. 22 may be used. Alternatively, the portion of the flywheel hub is not removed, and the Belleview washer 362 is positioned between the outside edge 215 of the flywheel hub 216 and the inner clutch plate collar 366, and a spring tensioner is not included.

In the preferred configuration, the Belleville spring 362 is positioned between the inner clutch plate collar 366 and the spring tensioner 368 to create the bias force. The bias force is created by compression of the Belleville spring 362 between the spring tensioner 368 and the inner clutch plate collar 366. One advantage of this embodiment is that the spring tensioner 368 may be rotated about the threaded outside circumference 379 of the axle housing 364 to move the spring tensioner 368 outwardly or inwardly, and accordingly easily adjust the break-free force of the flywheel. Rotating the spring tensioner about the threaded axle housing 379 so as to move the spring tensioner 368 outwardly will increase the compression of the Belleville washer, and hence increase the break-free force. Rotating the spring tensioner 368 about the threaded axle housing 379 so as to move the spring tensioner inwardly will decrease the compression of the Belleville washer 362, and hence decrease the break-free force. The compression of the Belleville washer 362 against the inner clutch plate collar 366 causes the inner clutch plate to be biased inwardly against the inner friction material 376, which is pushed against the slave gear collar 370, which in turn is pushed against the outer clutch plate material 374 and in turn frictionally engages the outer clutch plate collar 372.

An additional advantage of this embodiment is that frictional engagement of the free wheel clutch mechanism 360 may be applied with preferably about 1.5 turns of the spring tensioner 368 about the axle housing. This provides for simple removal and unloading of the device. Additionally, as the clutch material (374, 376) wears down and becomes thinner, the compression of the Belleville washer 362 may be readily adjusted by way of rotation of the spring tensioner 368. As with other embodiments described herein, as the clutch plate material (374, 376) wears down, the Belleville washer 362 will extend and maintain the friction force on the clutch system 360. The break-free force, however, will decrease unless appropriate adjustments are made with the spring tensioner 368.

The inner clutch plate washer 376 is positioned adjacent to and in contact with the inner clutch plate 366, and the slave gear collar 370 is similar to the slave gear collars described in previous embodiments and includes a bearing 382 positioned between the slave gear collar 370 and the outer circumference of the outer clutch plate body 372, the bearing 382 being a two-way bearing allowing the slave gear collar 370 to freewheel when turned in a reverse direction, and locking to provide a direct drive when turned in the forward direction. Preferably, an INA Bearing Company shell-type roller clutch bearing as described previously herein is used. Gear teeth are formed on the outer circumference of the slave gear collar 370 (or sprocket) for engagement with the chain of the drive train. As the slave gear collar 370 is driven in the forward direction by the drive train, the one-way bearings lock and create a direct drive relationship. When sufficient reverse drive force is applied to the slave gear collar 370 through the drive train and the break-free force is exceeded, the one-way bearings release and allow the drive train collar to free-wheel under the influence of the frictional relationship with the inner and outer clutch plates, similar to the interaction described with respect to the other embodiments herein.

In this embodiment, the clutch plate material (374, 376) is preferably a hard plastic such as Polyethylene, which has advantageous wear characteristics. Using the hard plastic as the clutch plate material, preferably 900 lb. of friction force is applied to the freewheel clutch 360 through the Belleville washer 362 using the spring tensioner 368. To adjust the friction, or break free force, the spring tensioner preferably includes a radial hole in its outside circumference in which a dowel may be inserted to rotate the spring tensioner. The friction force on the Belleville washer may range from between 0 lb. to about 1200 lb. depending on how the spring tensioner is adjusted. At the pedals, the break-free torque is preferably about 344 in.-lb. to about 444 in.-lb. The preferred specifications of the Belleville washer are: OD=55.8 mm; ID=28.6 mm; Thickness (uncompressed)=2 mm; 830 (+/−20) lb. at 75% compression; 1110 (+/−30) lb. at 100% compression; Material=SAE 1075.

Similar to the embodiment illustrated in FIG. 5a, the outer clutch plate collar 372 includes a hollow cylindrical main body 384 with internal threads at one end for engagement with the external threads on the outer end 386 of the axle housing 364. The clutch plate collar 372 defines an outer radially extending engagement flange 388 attached to the outside end of the main body, and an inner radially extending flange, which is the inner clutch plate 366, moveably attached to the inside end of the cylindrical main body 384. The inner clutch plate 366 is able to move axially (longitudinally) along all or a portion of the length of the cylinder main body 384 of the outer clutch plate collar 372. As shown with reference to the embodiments illustrated in FIGS. 7, 8, and 9, the inner flange 366 has a central bore 124 defining a plurality of radially inwardly extending keys 126. Corresponding longitudinally extending slots 128 are formed on the surface of the cylindrical main body of the outer clutch plate collar 372 at its inner end, and extend at least partially along the length of the main body, to receive keys 126 and allow the inner flange to move (float) axially along the length of the cylindrical main body 384, to the extent of the length of the slots. When the cylindrical main body 384 is threadedly connected to the axle housing 364, the inner flange 366 is positioned so the keys 126 are slidably received in the slots, and the inner flange 366 is retained on the end of the cylindrical main body 384 by the axle housing 364. The intersection of the keys in the slots make the inner flange turn with the cylindrical main body.

It is contemplated that these free wheel clutch mechanism structures described herein could be mounted on the drive sprocket of the drive train, in addition to the slave sprocket of the drive train. It is also contemplated that a one-way bearing need not be used in all circumstances, in which case the clutch mechanism would be caused to slip if the break-free force threshold was reached in either the forward or rearward drivetrain direction.

Presently preferred embodiments of the present invention and many of its improvements have been described with a degree of particularity. The previous description is of preferred examples for implementing the invention, and the scope of the invention should not necessarily be limited by this description. The scope of the present invention is defined by the scope of the following claims.

We claim:

1. An exercise bicycle comprising:
a frame including a seat and handlebars;
a flywheel including an axle housing, the flywheel being rotatably supported on the frame;
a drive train, including a drive train sprocket, a crank arm attached to and extending from the drive train sprocket, and a pedal attached to the crank arm, the drive train being rotatably supported by the frame, and a slave sprocket coupled to the flywheel, with the drive train and slave sprockets connected in a direct-drive relationship, the drive train drivable in a forward and rearward direction to cause the flywheel to rotate;
a one way bearing circumferentially mounted on the axle housing, the slave sprocket circumferentially mounted in engagement with the one way bearing;
a spring tensioner coupled to the axle housing; and
a clutch positioned to engage with the slave sprocket and the flywheel, the clutch including a biasing member positioned between the clutch and the spring tensioner, the clutch creating a break free force.

2. The exercise bicycle of claim 1, the biasing member being a Belleville washer.

3. The exercise bicycle of claim 1, the axle housing defining a cylinder wherein a outside circumference of the cylinder adjacent the clutch is threaded.

4. The exercise bicycle of claim 3, the spring tensioner defining a threaded aperture adapted to engage the threaded outside circumference of the axle housing.

5. The exercise bicycle of claim 4, wherein the spring tensioner is rotatable about the axle housing so as to increase or decrease the break free force.

6. The exercise bicycle of claim 1, the clutch including an inner clutch plate adjacent an inside edge of the slave sprocket, and an outer clutch plate adjacent an outer edge of the slave sprocket.

7. The exercise bicycle of claim 6, the clutch including an inner clutch washer positioned between the outer clutch plate and the slave sprocket, and an outer clutch washer positioned between the outer clutch plate and the slave sprocket.

8. The exercise bicycle of claim 7 wherein the inner clutch washer and the outer clutch washer are polyethylene.

9. The exercise bicycle of claim 2 wherein the spring tensioner defines an outwardly extending flange circumferential to the axle housing, the outwardly extending flange adapted to center the Belleville washer about the axle housing.

10. The exercise bicycle of claim 1, wherein the clutch comprises a clutch plate circumferentially disposed about the axle housing and operably connected with the slave sprocket.

11. The exercise bicycle of claim 1, wherein the clutch comprises a clutch plate circumferentially disposed about the axle housing and operably connected with the slave sprocket.

* * * * *

UNITED STATES PATENT AND TRADEMARK OFFICE
CERTIFICATE OF CORRECTION

PATENT NO.       : 7,569,001 B2
APPLICATION NO.  : 09/803630
DATED            : August 4, 2009
INVENTOR(S)      : Patrick Warner et al.

It is certified that error appears in the above-identified patent and that said Letters Patent is hereby corrected as shown below:

Title page, Related U.S. Application Data, at the end of Item (60), insert:

--, which claims benefit of U.S. provisional application No. 60/038,726, filed on February 18, 1997.--

Signed and Sealed this

Sixth Day of October, 2009

David J. Kappos
*Director of the United States Patent and Trademark Office*